United States Patent
Wu

(10) Patent No.: US 8,495,241 B2
(45) Date of Patent: Jul. 23, 2013

(54) COMMUNICATION APPARATUS AND METHOD THEREFOR

(75) Inventor: Weiyu Wu, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1015 days.

(21) Appl. No.: 12/461,469

(22) Filed: Aug. 12, 2009

(65) Prior Publication Data

US 2010/0058155 A1    Mar. 4, 2010

(30) Foreign Application Priority Data

Aug. 29, 2008 (JP) ................................ 2008-221498

(51) Int. Cl.
*G06F 15/16* (2006.01)
(52) U.S. Cl.
USPC ............................ 709/236; 714/52; 714/807
(58) Field of Classification Search
USPC ..................................... 709/236; 714/52, 807
See application file for complete search history.

(56) References Cited

U.S. PATENT DOCUMENTS

| | | | | |
|---|---|---|---|---|
| 5,826,032 A * | 10/1998 | Finn et al. | ...................... | 709/236 |
| 6,412,092 B1 * | 6/2002 | Raghunath | .................... | 714/807 |
| 6,728,929 B1 * | 4/2004 | Luong | ........................... | 714/807 |
| 7,020,715 B2 * | 3/2006 | Venkataraman et al. | ...... | 709/236 |
| 7,360,148 B2 * | 4/2008 | D'Arcy et al. | ................. | 714/807 |
| 7,821,931 B2 * | 10/2010 | Swenson et al. | ............... | 370/230 |
| 8,219,866 B2 * | 7/2012 | Suzuki | ........................... | 714/748 |
| 8,225,188 B2 * | 7/2012 | Basso et al. | .................... | 714/807 |
| 2002/0101872 A1 * | 8/2002 | Boivie | ........................... | 370/393 |
| 2002/0184598 A1 * | 12/2002 | Bace | .............................. | 714/807 |
| 2004/0218623 A1 * | 11/2004 | Goldenberg et al. | .......... | 370/463 |
| 2012/0221928 A1 * | 8/2012 | Abel et al. | ..................... | 714/807 |

FOREIGN PATENT DOCUMENTS

| | | |
|---|---|---|
| EP | 1 124 362 | 8/2001 |
| JP | 2001-268159 | 9/2001 |
| JP | 2005-167544 A | 6/2005 |
| JP | 2006-303765 | 11/2006 |

OTHER PUBLICATIONS

Notification of Reasons(s) for Refusal dated Jan. 8, 2013 (with English translation).

* cited by examiner

*Primary Examiner* — Kevin Bates
(74) *Attorney, Agent, or Firm* — McGinn IP Law Group, PLLC

(57) ABSTRACT

Provided are a communication apparatus and a method therefor that are capable of executing a checksum attachment processing without increase of a circuit scale. A data generating unit (for example, a CPU) that forms a communication apparatus generates data, and stores the data in a memory. A checksum processor calculates a checksum for the data read from the memory, and writes the checksum into a predetermined position in the data stored in the memory. A data sending unit (for example, a transmission processor, a MAC processing circuit, and a PHY processing circuit) reads the data having the written checksum from the memory, and sends the data to a network.

12 Claims, 12 Drawing Sheets

COMMUNICATION APPARATUS AND METHOD THEREFOR

BACKGROUND OF THE INVENTION

1. Field of the Invention

The present invention relates to a communication apparatus and a method therefor, and particularly, relates to a communication apparatus and a method for attaching a checksum for error detection to data to be sent to a network such as the Internet or a local area network (LAN).

2. Description of the Related Art

In recent years, such a communication apparatus has been required to perform checksum attachment processing at high speed in order to deliver high quality images over the Internet and through moving image transfer.

For example, Japanese Patent Application Publication No. 2006-303765 discloses a communication apparatus that performs checksum attachment processing in accordance with Transmission Control Protocol (TCP)/Internet Protocol (IP). FIG. 10 shows an example of a configuration of this communication apparatus.

The communication apparatus 1x shown in FIG. 10 includes a central processing unit (CPU) 10, a main memory 20, an interface circuit 110 that functions as an interface between the CPU 10 and the main memory 20, a TCP/IP transmission processing circuit 120, a TCP/IP reception processing circuit 130, a media access control (MAC) processing circuit 50 connected to the circuits 120 and 130, and a physical layer processing circuit 60 (hereinafter, PHY processing circuit) connected between this MAC processing circuit 50 and an Ethernet (registered trademark) cable 2. Here, the CPU 10, the main memory 20, and the interface circuit 110 are mutually connected through a bus 70. Moreover, a hard disk drive (HDD) 80, an input unit 90, and a display unit 100 are connected to the bus 70. A web browser program, a mail client program, and the like used by the CPU 10 are recorded in the HDD 80. The input unit 90 receives an input from a user (not shown). The display unit 100 displays results on processing performed by the CPU 10 to the user.

In other words, in the communication apparatus 1x, as shown by a dotted line in FIG. 10, the MAC processing circuit 50 and the PHY processing circuit 60 act as a network interface layer Lt1 in a TCP/IP hierarchical model. The interface circuit 110, the TCP/IP transmission processing circuit 120, and the TCP/IP reception processing circuit 130 act as an Internet layer and transport layer Lt2. Further, the CPU 10, the main memory 20, and the HDD 80, the input unit 90, and the display unit 100 act as an application layer Lt3.

The TCP/IP transmission processing circuit 120 includes a direct memory access (DMA) processor 121, a check sum controller 122, a buffer memory 123, and a check sum calculator 124. Further, the checksum controller 122 has an IP checksum register 125 therein.

In data sending operation, first, the CPU 10 executes the above-mentioned web browser program, mail client program, or the like to generate an Ethernet frame FRe shown in FIG. 11 in the main memory 20.

Here, the Ethernet frame FRe is a frame in which a MAC header HD3 and a frame check sequence (FCS) are attached to a TCP/IP stream data SD including an IP header HD1, a TCP header HD2, and a payload PL. Here, the FCS is generated and attached by the MAC processing circuit 50, as will be described later.

The IP header HD1 alone is a target for check sum calculation, and includes a version, a header length, a type, a packet length (TCP/IP stream data length), a packet identification number, a flag, a fragmentation offset, a TTL (Time To Live), an upper layer protocol number, an IP checksum field Fc1, a sending source IP address, a destination IP address, and an option field. Out of these, the IP checksum field Fc1 is a field for storing a calculated checksum CSi for the IP header HD1 (hereinafter, referred to as an IP checksum).

Further, the TCP header HD2 as well as the payload PL and a TCP pseudo header HD4 shown in FIG. 11 are targets for checksum calculation. The TCP header HD2 includes a sending source port number, a destination port number, a sequence number, an Ack number, an offset, a Reserved area, various flags such as URG, ACK, PSH, RST, SYN, and FIN, a Window size, a TCP checksum field Fc2, an Urgent pointer, and an option field. Out of these, the TCP checksum field Fc2 is a field for storing a calculated checksum CSt for the TCP header HD2, the payload PL, and the TCP pseudo header (hereinafter, referred to as a TCP checksum).

When the CPU 10 generates the above-mentioned Ethernet frame FRe (except for the FCS) in the main memory 20, the DMA processor 121 in the TCP/IP transmission processing circuit 120 performs DMA transfer of the frame FRe from the main memory 20 to the checksum controller 122 through the interface circuit 110 (Step S101), as shown in FIG. 12. More specifically, the DMA processor 121 transfers the MAC header HD3, the IP header HD1, the TCP header HD2, the payload PL, and the TCP pseudo header HD4 in this order to the checksum controller 122.

First, the checksum controller 122 receives the MAC header HD3 from the DMA processor 121. At this time, the checksum controller 122 writes the received MAC header HD3 into the buffer memory 123 (Step S102).

Next, the checksum controller 122 receives the IP header HD1 from the DMA processor 121. At this time, the checksum controller 122 writes the received IP header HD1 into the buffer memory 123 (Step S103), and also transfers the IP header HD1 to the checksum calculator 124 (Step S104). The checksum calculator 124 calculates the IP checksum CSi (Step S105), and returns the IP checksum CSi to the checksum controller 122 (Step S106). Then, the checksum controller 122 stores the IP checksum CSi in the IP checksum register 125 (Step S107).

Subsequently, the checksum controller 122 receives the TCP header HD2 and the payload PL from the DMA processor 121. At this time, the checksum controller 122 writes the received TCP header HD2 and payload PL into the buffer memory 123 (Step S108), and also transfers the TCP header HD2 and payload PL to the checksum calculator 124 (Step S109).

Thereafter, the checksum controller 122 receives the TCP pseudo header HD4 from the DMA processor 121. At this time, the checksum controller 122 transfers the received TCP pseudo header HD4 to the checksum calculator 124 (Step S110). Since the TCP pseudo header HD4 is used only for calculation of the TCP checksum CSt (that is, the TCP pseudo header HD4 is not sent to the network), the checksum controller 122 does not write the TCP pseudo header HD4 into the buffer memory 123, unlike the above-mentioned steps S103 and S108. As a result, the MAC header HD3, the IP header HD1, the TCP header HD2, and the payload PL are stored in the buffer memory 123.

Then, the checksum calculator 124 calculates the TCP checksum CSt (Step S111), and returns the TCP checksum Cst to the checksum controller 122 (Step S112).

Subsequently, the checksum controller 122 reads the MAC header HD3, the IP header HD1, the TCP header HD2, and the payload PL, which are stored in the buffer memory 123 (Step S113), and starts to sequentially transfer the read MAC header HD3, IP header HD1, TCP header HD2 and payload PL to the lower layer (MAC processing circuit 50 shown in FIG. 10).

More specifically, firstly, the checksum controller 122 transfers the MAC header HD3 read from the buffer memory 123 to the MAC processing circuit 50 (Step S114).

Secondly, the checksum controller 122 inserts (writes) the IP checksum CSi stored in the IP checksum register 125 into the IP checksum field Fc1 of the IP header HD1 read from the buffer memory 123, and then transfers the IP header HD1 to the MAC processing circuit 50 (Step S115).

Thirdly, the checksum controller 122 inserts the TCP checksum CSt received at the above-mentioned step S112 into the TCP checksum field Fc2 of the TCP header HD2 read from the buffer memory 123, and then transfers the TCP header HD2 to the MAC processing circuit 50 (Step S116).

Lastly, the checksum controller 122 transfers the payload PL read from the buffer memory 123 to the MAC processing circuit 50 (Step S117).

The MAC processing circuit 50 attaches the FCS to an end of a frame consisting of the MAC header HD3, the IP header HD1, the TCP header HD2, and the payload PL received from the checksum controller 122, and then transfers the frame to the PHY processing circuit 60. Thereby, the Ethernet frame FRe is sent to the Ethernet cable 2 (namely, a network) through the PHY processing circuit 60.

However, Japanese Patent Application Publication No. 2006-303765 has a problem that the TCP/IP transmission processing circuit needs to have a buffer memory capacity large enough to store TCP/IP stream data, and thus needs to be made large in circuit scale.

Japanese Patent Application Publication No. 2001-268159 discloses a communication apparatus in which a buffer memory for storing checksum target data received from an upper layer, and a buffer memory for storing data after checksum writing are provided separately. With this configuration, the communication apparatus executes checksum calculation processing and data send processing in parallel. However, this communication apparatus needs a larger buffer memory capacity for the checksum attachment processing, than that of Japanese Patent Application Publication No. 2006-303765, thereby making the circuit scale much larger.

SUMMARY OF THE INVENTION

A communication apparatus according to one aspect of the present invention includes: a data generating unit that generates data and stores the data in a memory; a checksum processor that calculates a checksum for the data read from the memory, and writes the checksum into a predetermined position in the data stored in the memory; and a data sending unit that reads, from the memory, the data having the checksum written therein, and sends the data to a network.

A communication method according to one aspect of the present invention includes: a data generating step for generating data and storing the data in a memory; a checksum processing step for calculating a checksum for the data read from the memory, and writing the checksum into a predetermined position in the data stored in the memory; and a data sending step for reading, from the memory, the data having the checksum written therein, and sending the data to a network.

Hence, in the present invention, increase of a circuit scale can be suppressed, since there is no necessity of providing another buffer memory to execute a checksum attachment processing.

According to the present invention, the checksum attachment processing can be executed without increase of a circuit scale, thereby achieving a communication apparatus with a smaller dimension and reduced costs.

DETAILED DESCRIPTION OF THE PREFERRED EMBODIMENTS

Figure 1:
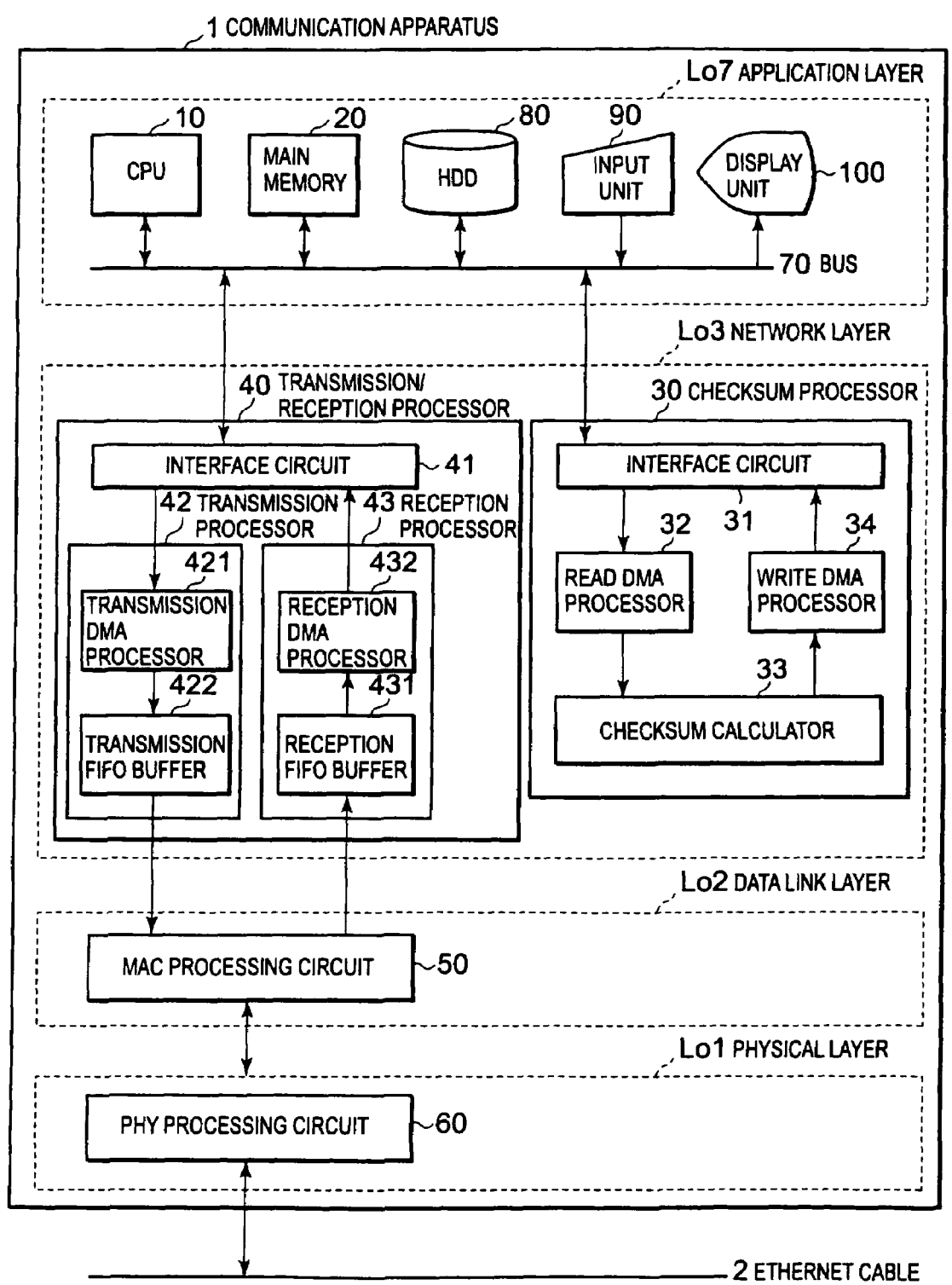
FIG. 1 is a block diagram showing an example of a configuration of a communication apparatus according to the present invention, which is common to embodiments 1 to 4.

Hereinafter, embodiments 1 to 4 of a communication apparatus according to the present invention will be described with reference to FIGS. 1 to 9. In each drawing, same reference numerals are given to same elements, and for clarification of description, overlapping description will be omitted where appropriate.

First, with reference to FIG. 1 and FIG. 2, description will be given on an example of a configuration and a schematic operation of the communication apparatus, which are common to the communication apparatuses according to embodiments 1 to 4, respectively.

Figure 10:
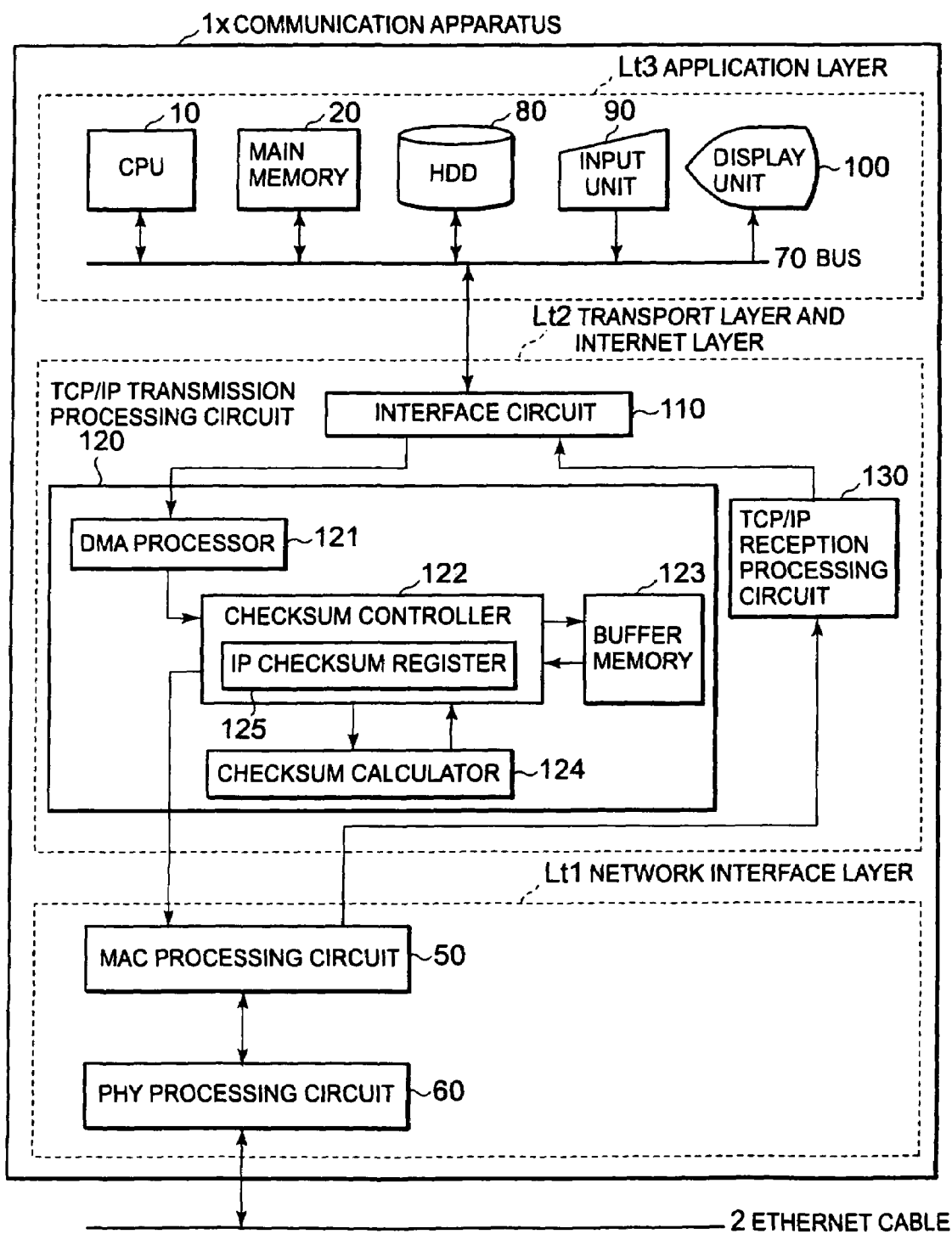
FIG. 10 is a block diagram showing an example of a configuration of a conventional communication apparatus.

Unlike the communication apparatus 1x, a communication apparatus 1 shown in FIG. 1 includes a checksum processor 30 and a transmission/reception processor 40, instead of the interface circuit 110, the TCP/IP transmission processing circuit 120, and the TCP/IP reception processing circuit 130 as shown in FIG. 10.

The checksum processor 30 includes an interface circuit 31, a read DMA processor 32, a checksum calculator 33, and a write DMA processor 34. The interface circuit 31 is connected to a bus 70, and functions as an interface between the checksum processor 30 and a CPU 10 and a main memory 20. The read DMA processor 32 reads data generated by the CPU 10 from the main memory 20 through the interface circuit 31. The checksum calculator 33 calculates a checksum for the data read by the read DMA processor 32. Through the interface circuit 31, the write DMA processor 34 writes the checksum calculated by the checksum calculator 33 into a predetermined position in the data stored in the main memory 20.

Moreover, the transmission/reception processor 40 includes an interface circuit 41, a transmission processor 42, and a reception processor 43. The interface circuit 41 is connected to the bus 70, and functions as an interface between the transmission/reception processor 40 and the CPU 10 and the main memory 20. The transmission processor 42 has a transmission DMA processor 421 that reads the data having the checksum written by the above-mentioned write DMA processor 34 from the main memory 20 through the interface circuit 41, and a transmission FIFO (First In First Out) buffer 422 for storing the data read by this transmission DMA processor 421. The data stored in the transmission FIFO buffer 422 is read by a MAC processing circuit 50, and subsequently, sent to an Ethernet cable 2 (namely, a network) through a PHY processing circuit 60. The reception processor 43 also has a reception FIFO buffer 431 for storing the data received from the network by the MAC processing circuit 50 and the PHY processing circuit 60, and a reception DMA processor 432 that reads the data from this reception FIFO buffer 431 and transfers the data to the CPU 10 or the main memory 20 through the interface circuit 41.

In other words, in the communication apparatus 1, as shown by a dotted line in FIG. 1, the MAC processing circuit 50 act as a data link layer Lo2, and the PHY processing circuit 60 act as a physical layer Lo1 in an OSI reference model. Moreover, the checksum processor 30 and the transmission/reception processor 40 act as a network layer Lo3. Further, the CPU 10, the main memory 20, an HDD 80, an input unit 90, and a display unit 100 act as an application layer Lo7.

The communication apparatus 1 is not limited to a wired network, and can be used for a wireless network. In this case, a circuit that operates in accordance with various kinds of wireless communication protocols is used for the MAC processing circuit 50 and the PHY processing circuit 60.

Figure 2:
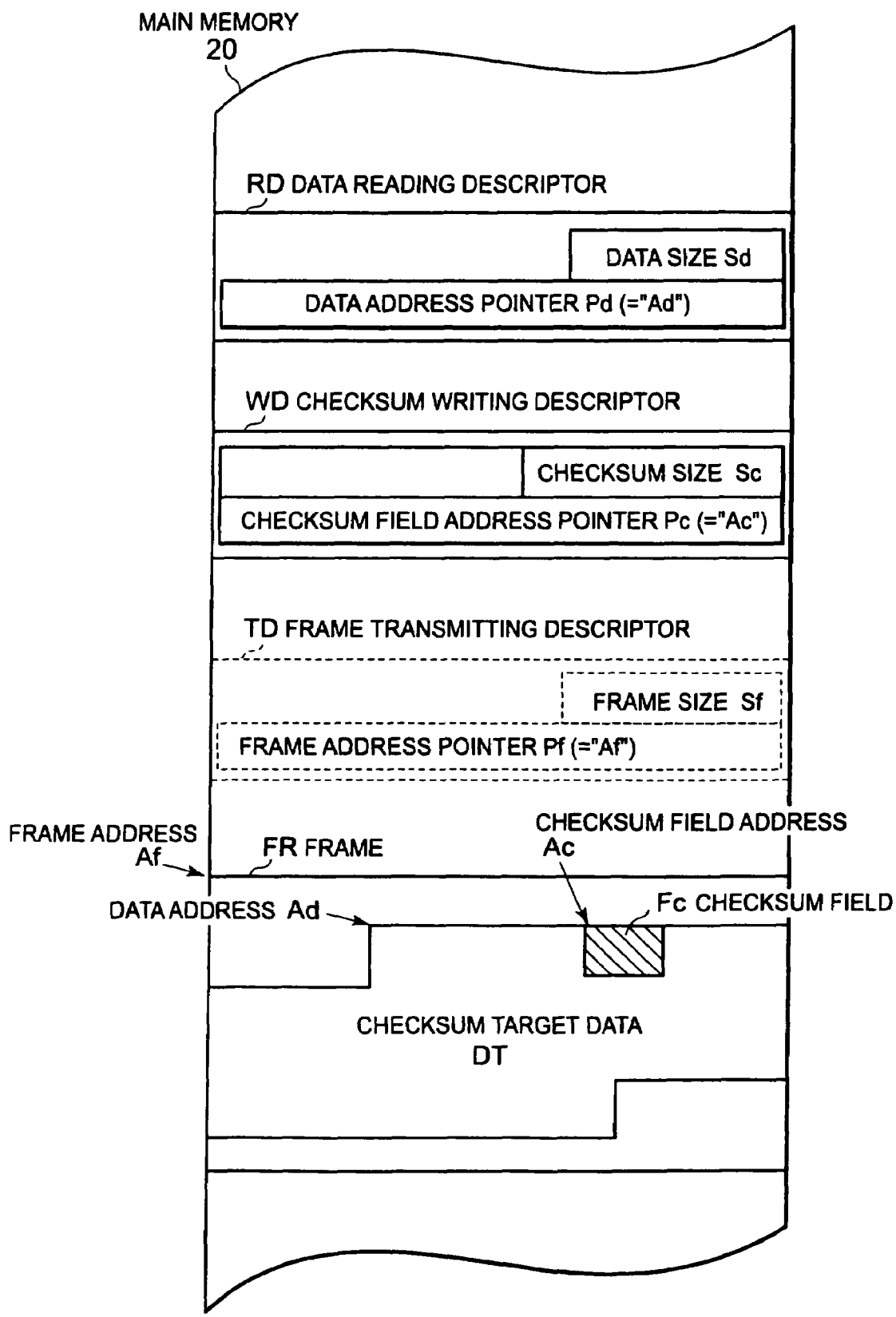
FIG. 2 is a diagram showing an example of a schematic configuration of a descriptor used in the communication apparatus according to embodiments 1 to 4 of the present invention.

Moreover, reading from and writing into the main memory 20 by the checksum processor 30 and reading from the main memory 20 by the transmission processor 42 can be simply performed, for example, by using a data reading descriptor RD, a checksum writing descriptor WD, and a frame (data) transmitting descriptor TD shown in FIG. 2.

More specifically, first, the CPU 10 generates a frame FR including a checksum target data DT, and stores the frame FR in the main memory 20. The whole frame FR may be a checksum target (that is, FR=DT may be held). Subsequent description is applied also to this case in the similar manner.

At this time, the CPU 10 stores the data reading descriptor RD in the main memory 20. The data reading descriptor Rd includes a size Sd of the data DT (hereinafter, referred to as a data size) and a data address pointer Pd in which a storage start address Ad of the data DT in the main memory 20 (hereinafter, referred to as a data address) is set. At the same time, the CPU 10 stores the checksum writing descriptor WD in the main memory 20. The checksum writing descriptor WD includes a size Sc of a checksum field Fc in the data DT (hereinafter, referred to as a checksum size), and an address of the checksum field Fc in the main memory 20, namely, a checksum field address pointer Pc in which a write start address Ac of the checksum (hereinafter, referred to as a checksum field address) is set.

Then, with reference to the data reading descriptor RD, the read DMA processor 32 in the checksum processor 30 reads the checksum target data DT from the main memory 20. More specifically, the read DMA processor 32 reads the data having the size indicated by the data size Sd from the address indicated by the data address pointer Pd. The read DMA processor 32 transfers the read data DT to the checksum calculator 33.

Then, the checksum calculator 33 calculates a checksum for the data DT, and transfers the checksum to the write DMA processor 34.

At this time, with reference to the checksum writing descriptor WD, the write DMA processor 34 writes the checksum received from the checksum calculator 33 into the main memory 20. More specifically, the write DMA processor 34 writes the checksum into an area that begins from the address indicated by the checksum field address pointer Pc and has the checksum size Sc (namely, into the checksum field Fc).

Reading from and writing into the main memory 20 by the checksum processor 30 is not limited to the case where the data reading descriptor RD and the checksum writing descriptor WD are used. Such reading and writing may be performed in a way that the CPU 10 directly notifies the checksum processor 30 of the data size Sd, the data address Ad, the checksum size Sc, and the checksum field address Ac.

Thus, in the communication apparatus 1, installation of any other buffer memory is unnecessary except the main memory 20 upon execution of a checksum attachment processing. Moreover, the TCP/IP transmission processing circuit 120 shown in FIG. 10 has a problem that there is a need for position detection (determination) of the checksum field Fc. However, the communication apparatus 1 eliminates position detection (determination) of the checksum field Fc by using the checksum writing descriptor WD (or by directly notifying the checksum processor 30 of the data size Sd, the data address Ad, the checksum size Sc, and the checksum field address Ac).

Thereafter, when writing of the checksum by the write DMA processor 34 is completed, the CPU 10 stores a frame transmitting descriptor TD in the main memory 20. The frame transmitting descriptor TD includes a size Sf of the frame FR (hereinafter, referred to as a frame size) and a frame address pointer Pf in which a storage start address Af of the frame FR in the main memory 20 (hereinafter, referred to as a frame address) is set, as shown by a dotted line in FIG. 2.

Then, with reference to the frame transmission descriptor TD, the transmission DMA processor 421 in the transmission processor 42 reads the frame FR from the main memory 20. More specifically, the transmission DMA processor 421 reads the data having a size indicated by the frame size Sf from the address indicated by the frame address pointer Pf. The transmission DMA processor 421 stores the read frame FR in the transmission FIFO buffer 422. When the whole frame FR is a checksum target (when FR=DT is held), the data reading descriptor RD can be used as a frame transmitting descriptor TD as it is. Accordingly, the frame FR can be read with reference to the data reading descriptor RD, and generation of the frame transmitting descriptor TD is unnecessary.

Thereby, the frame FR having the checksum written therein is sent to the network through the MAC processing circuit 50, the PHY processing circuit 60, and the Ethernet cable 2.

Reading from the main memory 20 by the transmission processing part 42 is not limited to the case where the frame transmitting descriptor TD is used. Such reading may be performed in a way that the CPU 10 directly notifies the transmission processor 42 of the frame size Sf and the frame address Af. Alternatively, the frame FR may be directly transferred from the CPU 10 to the transmission processor 42.

Hereinafter, with reference to FIG. 3 to FIG. 9, detailed description will be given on embodiments 1 to 4.

Embodiment 1

Figure 11:
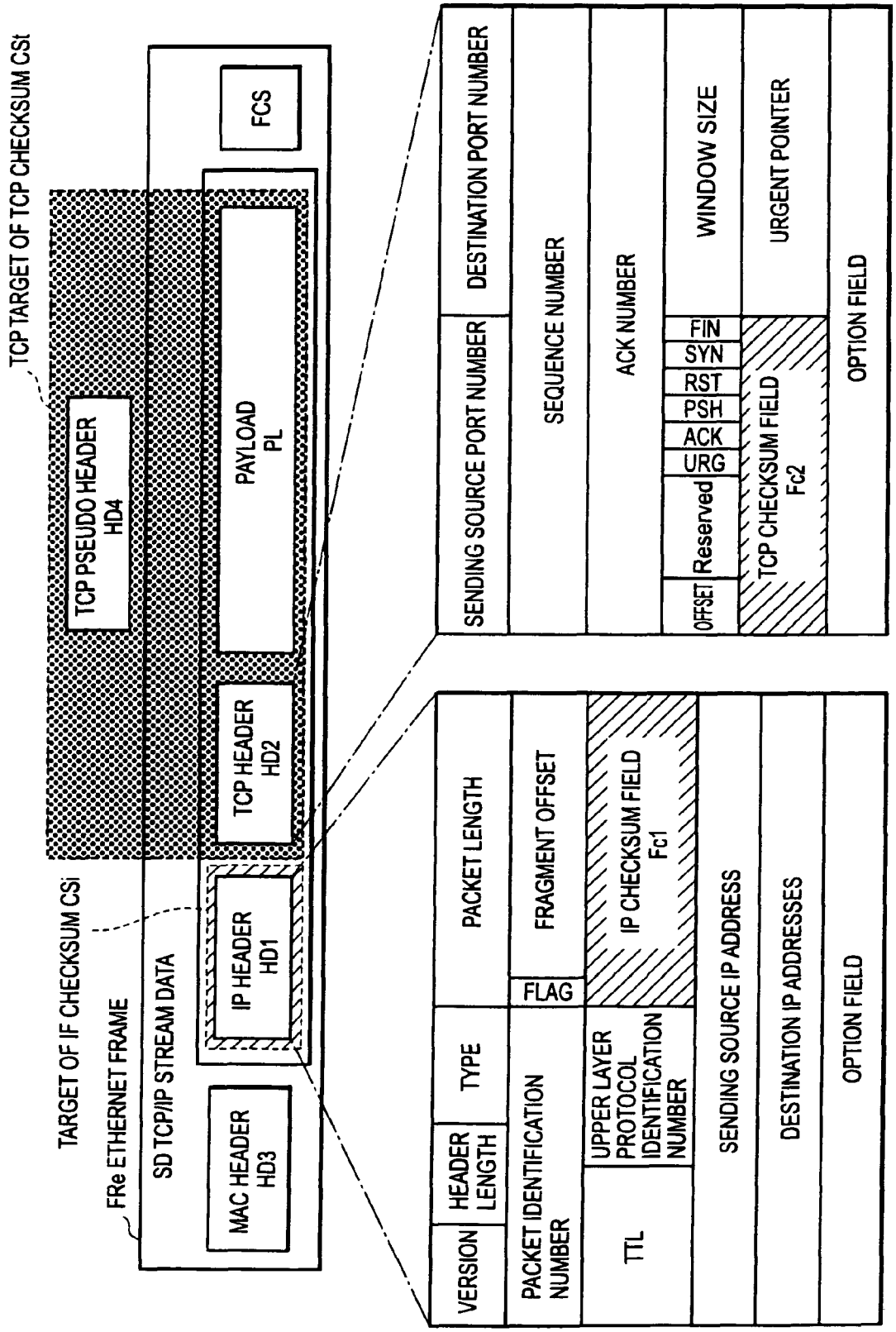
FIG. 11 is a diagram showing a general example of a configuration of an Ethernet frame.
Figure 12:
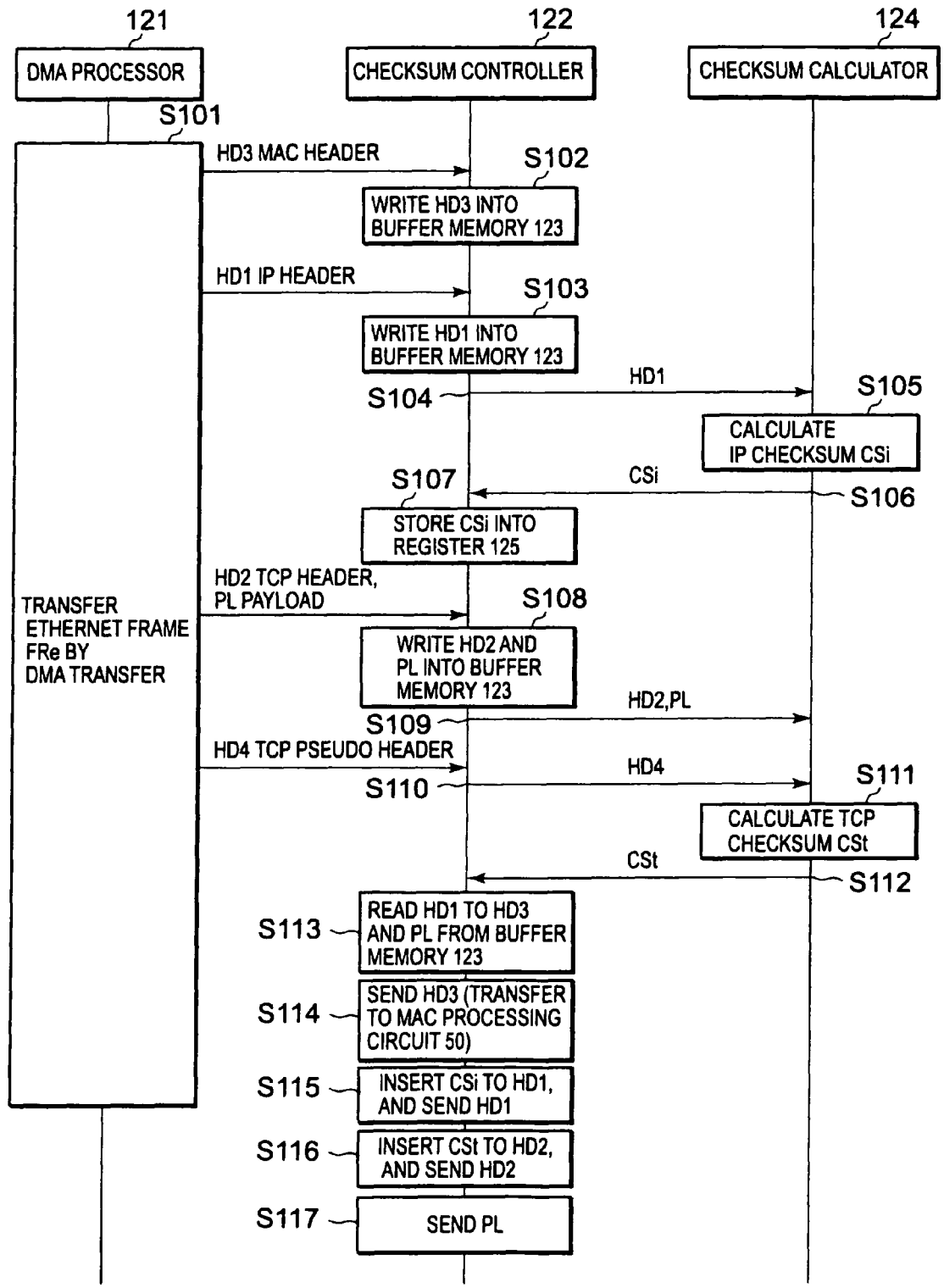
FIG. 12 is a sequence diagram showing an operation example of the conventional communication apparatus.

The present embodiment describes a case where the communication apparatus 1 shown in FIG. 1 executes a checksum attachment processing on the Ethernet frame FRe shown in FIG. 11.

Figure 3:
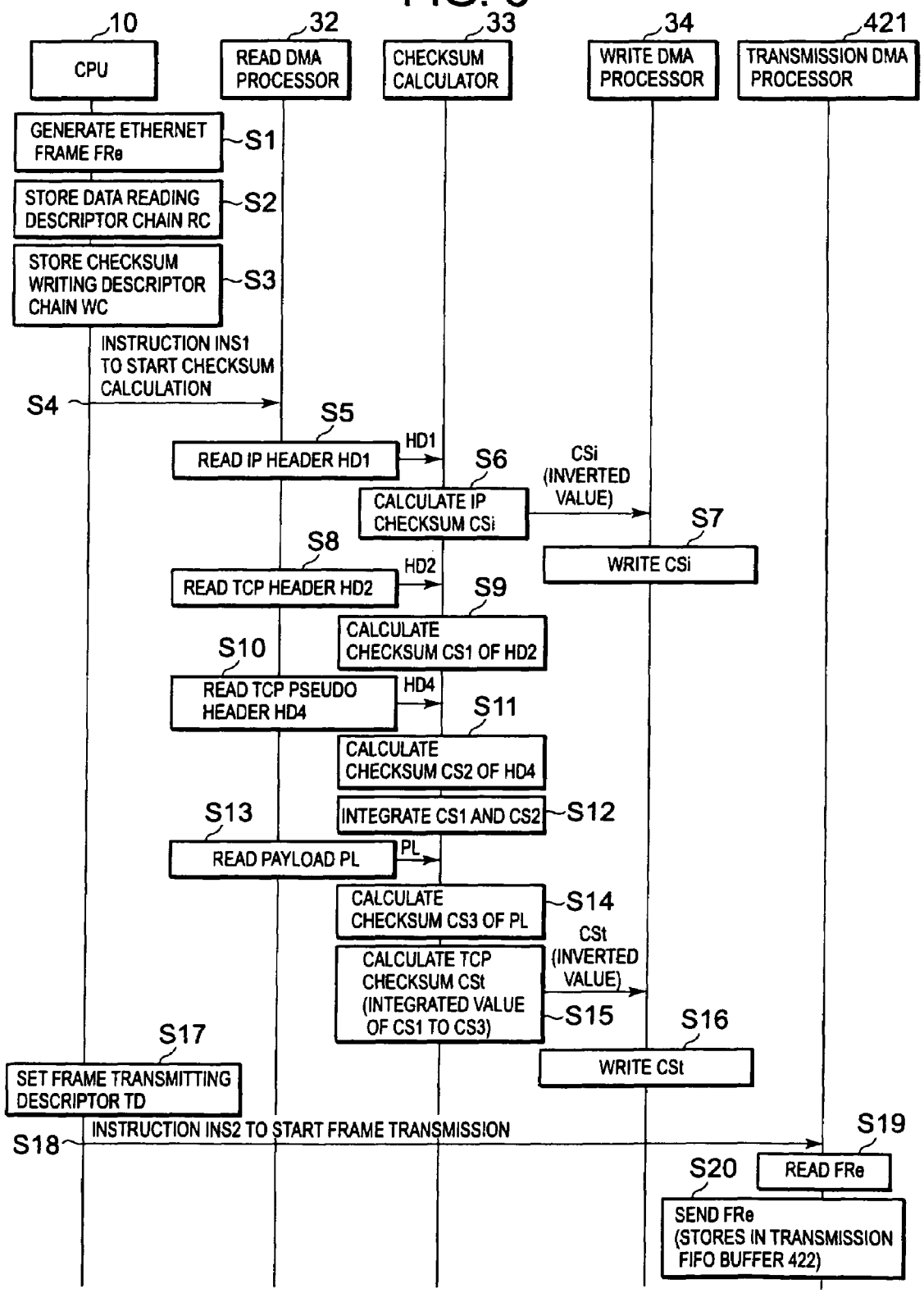
FIG. 3 is a sequence diagram showing an example of a frame sending operation in the communication apparatus according to embodiment 1 of the present invention.

As shown in FIG. 3, first, the CPU 10 generates the Ethernet frame FRe, and stores the Ethernet frame FRe in the main memory 20 (Step S1). At this time, the CPU 10 clears (initializes) an IP checksum field Fc1 in an IP header HD1 and a TCP checksum field Fc2 in a TCP header HD2 with "0." The CPU 10 also generates a TCP pseudo header HD4, and stores the TCP pseudo header HD4 in the main memory 20.

Figure 4:
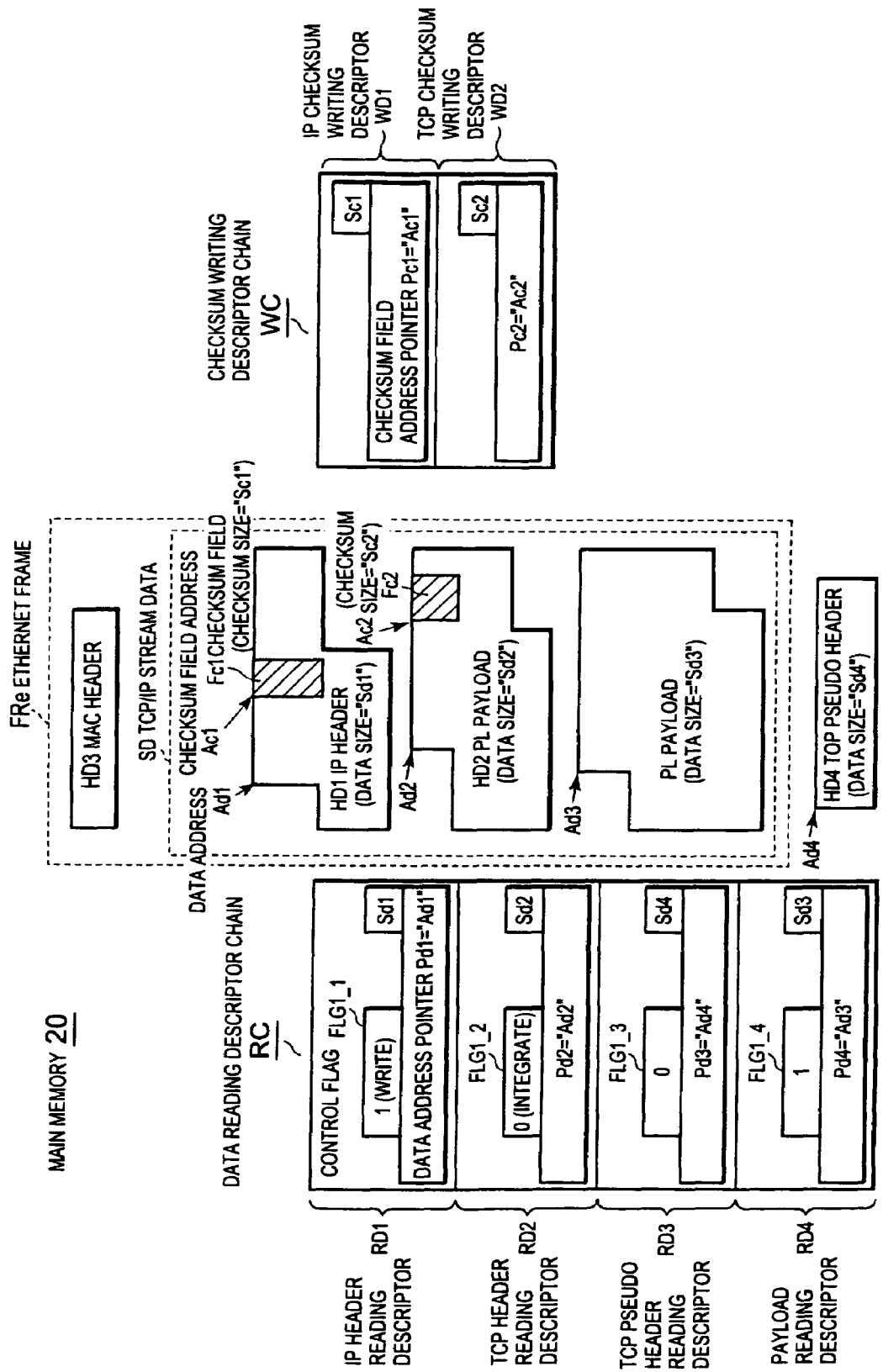
FIG. 4 is a diagram showing an example of a configuration of a descriptor chain used in the communication apparatus according to embodiment 1 of the present invention.

Then, the CPU 10 stores a data reading descriptor chain RC in the main memory 20 (Step S2). The data reading descriptor chain RC consists of an IP header reading descriptor RD1, a TCP header reading descriptor RD2, a TCP pseudo header reading descriptor RD3, and a payload reading descriptor RD4, as shown in FIG. 4.

Here, in the IP header reading descriptor RD1, data size="Sd1 (size of IP header HD1)" and data address pointer Pd1="data address Ad1 (storage start address of the IP header HD1)" are set. In the TCP header reading descriptor RD2, data size="Sd2 (size of the TCP header HD2)" and data address pointer Pd2="data address Ad2 (storage start address of the TCP header HD2)" are set. In the TCP pseudo header reading descriptor RD3, data size="Sd4 (size of the TCP pseudo header HD4)" and data address pointer Pd3="data address Ad4 (storage start address of the TCP pseudo header HD4)" are set. In the payload reading descriptor RD4, data size="Sd3 (size of the payload PL)" and data address pointer Pd4="data address Ad3 (storage start address of the payload PL)" are set.

In the present embodiment, the CPU 10 sets control flags FLG1_1 to FLG1_4 (hereinafter, may be generically referred to as a reference numeral FLG1) in the reading descriptors RD1 to RD4, respectively. This control flag FLG1 is control information for instructing the checksum processor 30 either to write the checksum for the data read with reference to the corresponding reading descriptor into the main memory 20, or to integrate the checksum with a checksum for the data read with reference to the next reading descriptor. The reason why the control flag FLG1 is provided is because it is necessary to calculate an integrated value of the checksum for the TCP header HD1, the checksum for the TCP pseudo header HD4, and the checksum for the payload PL as the TCP checksum. Accordingly, the CPU 10 sets "1 (write)" in the control flags FLG1_1 and FLG1_4, while setting "0 (integrate)" in the control flags FLG1_2 and FLG1_3.

Then, the CPU 10 stores a checksum writing descriptor chain WC in the main memory 20 (Step S3). The checksum writing descriptor chain WC consists of an IP checksum writing descriptor WD1 and a TCP checksum writing descriptor WD2.

Here, in the IP checksum writing descriptor WD1, data size="Sc1 (size of the IP checksum)" and a checksum field address pointer Pc1="checksum field address Ac1 (address of the checksum field Fc1 in the IP header HD1)" are set. In the TCP checksum writing descriptor WD2, data size="Sc2 (size of the TCP checksum)" and a checksum field address pointer Pc2="checksum field address Ac2 (address of the checksum field Fc2 in the TCP header HD2)" are set.

Subsequent to the above-mentioned steps S2 and S3, the CPU 10 gives a checksum calculation start instruction INS1 to the checksum processor 30 (step S4).

When receiving the instruction INST1, first, the read DMA processor 32 in the checksum processor 30 reads the IP header HD1 from the main memory 20, with reference to the IP header reading descriptor RD1 in the data reading descriptor chain RC, and transfers the IP header HD1 to the checksum calculator 33 (Step S5). Since "1 (write)" is set in the control flag FLG1_1 in the IP header reading descriptor RD1 at this time, the read DMA processor 32 instructs the checksum calculator 33 to invert and then output the calculated checksum. This is because the IP specifies that an inverted value of the IP checksum is stored in the IP checksum field Fc1.

The checksum calculator 33 calculates the IP checksum CSi from the received IP header HD1, and transfers the inverted value of the IP checksum CSi to the write DMA processor 34 (Step S6) In parallel with the above-mentioned step S6, the read DMA processor 32 hands over a right of control to the write DMA processor 34, since the control flag FLG1_1="1 (write)" is held. By referring to an IP checksum writing descriptor WD1 in the checksum writing descriptor chain WC, the write DMA processor 34 recognizes a writing position of the IP checksum CSi, and writes the IP checksum CSi (inverted value) into the checksum field Fc1 (Step S7). After writing into the IP checksum CSi, the write DMA processor 34 hands over the right of control to the read DMA processor 32.

Subsequently, by referring to a TCP header reading descriptor RD2, the read DMA processor 32 reads the TCP header HD2 from the main memory 20, and transfers the TCP header HD2 to the checksum calculator 33 (Step S8). Since "0 (integrate)" is set in the control flag FLG1_2 in the TCP header reading descriptor RD2 at this time, the read DMA processor 32 instructs the checksum calculator 33 to integrate the calculated checksum with a checksum for the next data without outputting the calculated checksum.

Accordingly, the checksum calculator 33 calculates a checksum CS1 for the received TCP header HD2, and thereafter waits for the next data input from the read DMA processor 32 (step S9).

Then, by referring to the TCP pseudo header reading descriptor RD3, the read DMA processor 32 reads the TCP pseudo header HD4 from the main memory 20, and transfers the TCP pseudo header HD4 to the checksum calculator 33 (Step S10). Since "0 (integrate)" is set in the control flag FLG1_3 in the TCP pseudo header reading descriptor RD3 at this time, the read DMA processor 32 instructs the checksum calculator 33 to integrate the calculated checksum with a checksum for the next data without outputting the calculated checksum.

Accordingly, the checksum calculator 33 calculates the checksum CS2 for the received TCP pseudo header HD4 (Step S11). After integrating the checksum CS2 with the checksum CS1 calculated at the above-mentioned step S9, the checksum calculator 33 waits for the next data input from the read DMA processor 32 (Step S12).

Then, by referring to the payload reading descriptor RD4, the read DMA processor 32 reads the payload PL from the main memory 20, and transfers the payload PL to the checksum calculator 33 (Step S13). Since "1 (write)" is set in the control flag FLG1_4 in the payload reading descriptor RD4 at this time, the read DMA processor 32 instructs the checksum calculator 33 to invert and then output the calculated checksum. This is because the TCP specifies that an inverted value of the TCP checksum is stored in the TCP checksum field Fc2.

The checksum calculator 33 calculates a checksum CS3 for the received payload PL (Step S14). Then, the checksum calculator 33 calculates a TCP checksum CSt by integrating the checksum CS3 with the integrated value of the checksums CS1 and CS2 calculated at the above-mentioned step S12, and transfers the inverted value of the TCP checksum CSt to the write DMA processor 34 (Step S15).

In parallel with the above-mentioned step S15, the read DMA processor 32 hands over the right of control to the write DMA processor 34, since the control flag FLG1_4="1 (write)" is held. By referring to the TCP checksum writing descriptor WD2, the write DMA processor 34 recognizes a writing position of the TCP checksum CSt, and writes the TCP checksum CSt (inverted value) into the checksum field Fc2 (Step S16).

Subsequently, the CPU 10 stores the frame transmitting descriptor TD (see FIG. 2) in the main memory 20 (Step S17). In the frame transmitting descriptor TD, the frame size and frame address of the Ethernet frame FRe in which the IP checksum CSi and the TCP checksum CSt are written are set. Then, the CPU 10 gives a frame transmission start instruction INS2 to the transmission processor 42 (Step S18).

When receiving the instruction INS2, the transmission DMA processor 421 in the transmission processor 42 reads the frame FRe from the main memory 20, with reference to the frame transmitting descriptor TD (Step S19), and stores the frame FRe in the transmission FIFO buffer 422 (Step S20). Thereby, the frame FRe is sent to the network through the MAC processing circuit 50, the PHY processing circuit 60, and the Ethernet cable 2.

Thus, at the time of the attachment processing of the IP checksum CSi and the TCP checksum CSt, the buffer memory capacity for the Ethernet frame FRe used in the TCP/IP transmission processing circuit 120 shown in FIG. 10 is unnecessary. In addition, use of the checksum writing descriptor chain WC makes position detection (determination) of the checksum field Fc1 in the IP header HD1 and the checksum field Fc2 in the TCP header HD2 unnecessary. Further, the TCP/IP transmission processing circuit 120 has a problem that there is a need for determining a checksum calculation range in accordance with a data identification result (in other words, identify that the data is either of the IP header, the TCP header, the TCP pseudo header, and the payload, and determine whether integration of the checksum is needed in accordance with the identified result). In contrast, determination of such a checksum calculation range is unnecessary by setting the control flag FLG1 in the reading descriptor RD in the data reading descriptor chain RC. Consequently, the circuit scale of the checksum processor 30 is significantly smaller than that of the TCP/IP transmission processing circuit 120.

When sending a plurality of Ethernet frames to the network, the communication apparatus 1 can repeatedly execute the above-mentioned steps S1 to S20 to thereby execute the checksum attachment processing for each Ethernet frame.

Figure 5:
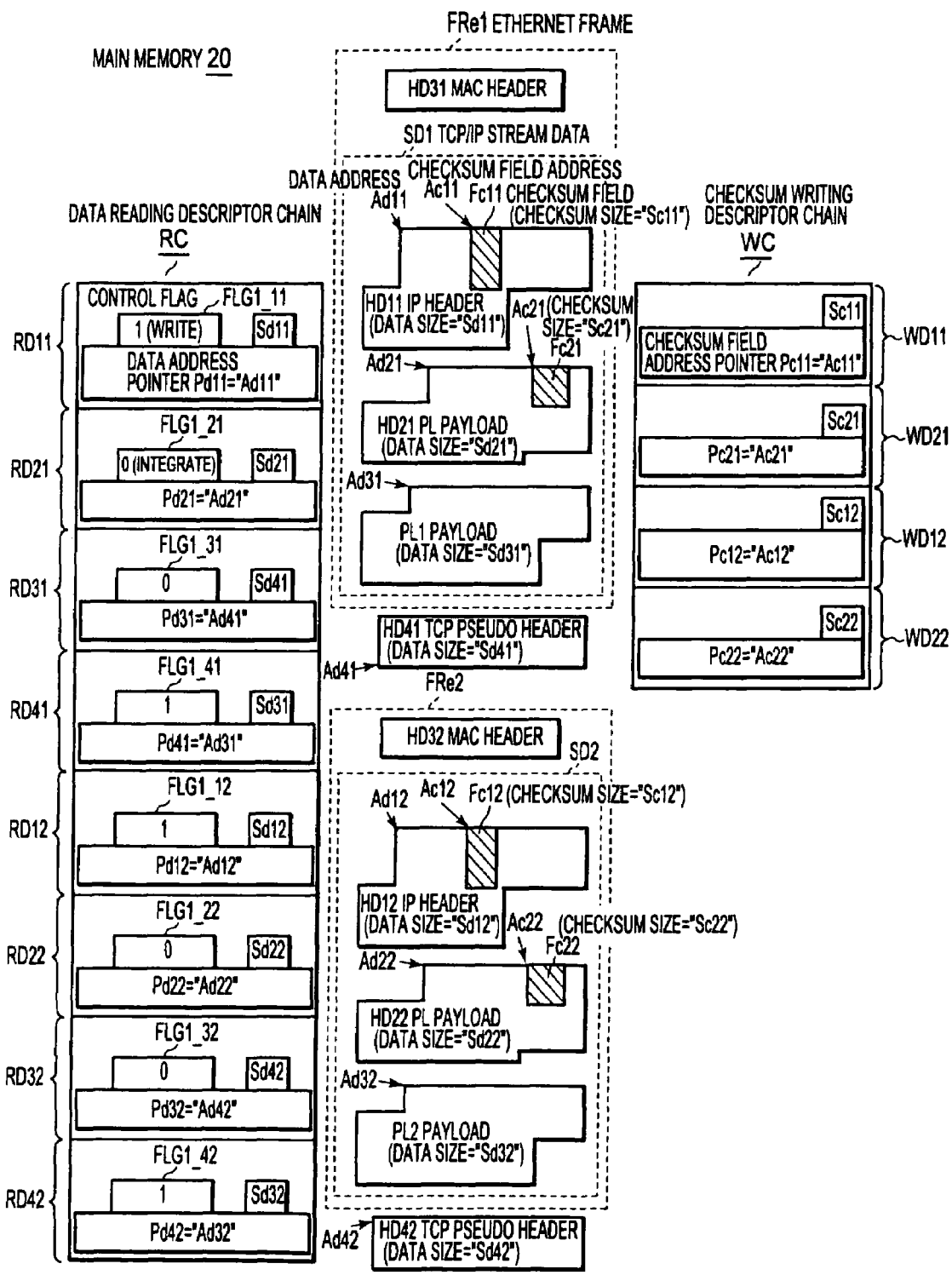
FIG. 5 is a diagram showing other example of the configuration of the descriptor chain used in the communication apparatus according to embodiment 1 of the present invention.

More specifically, the CPU 10 repeatedly executes the above-mentioned steps S1 to S3 to set the reading descriptor RD (RD11, RD21, RD31, RD41, RD12, RD22, RD32, RD42) in the data reading descriptor chain RC and the writing descriptor WD (WD11, WD21, WD12, WD22) in the checksum writing descriptor chain WC, for the Ethernet frames FRe1 and FRe2, as shown in FIG. 5. The checksum processor 30 repeatedly executes the above-mentioned steps S5 to S16 to attach checksums to the respective Ethernet frames FRe1 and FRe2. The transmission processor 42 repeatedly executes the above-mentioned steps S19 and S20 to send the respective Ethernet frames FRe1 and FRe2 to the network.

The communication apparatus 1 can also execute the checksum attachment processing in accordance with communication protocols other than the TCP/IP. This is because the size and storage start address of each checksum target data can be arbitrarily set in each reading descriptor in the data reading descriptor chain RC, in otherwords, because there is no necessity of restricting each checksum target data to a fixed length and each checksum target data can be stored in a discontinuous area. For example, when the UDP (User Datagram Protocol) is applied, the CPU 10 may store a UDP header, a UDP pseudo header, and read descriptors for these in the main memory 20 instead of the TCP header, the TCP pseudo headers, and reading descriptors for these. Further in the application of the UDP, when writing the integrated value of the checksums for the UDP header, the UDP pseudo header, and the payload into the checksum field in the UDP header stored in the main memory 20, the checksum processor 30 may not invert the integrated value.

Embodiment 2

Figure 6:
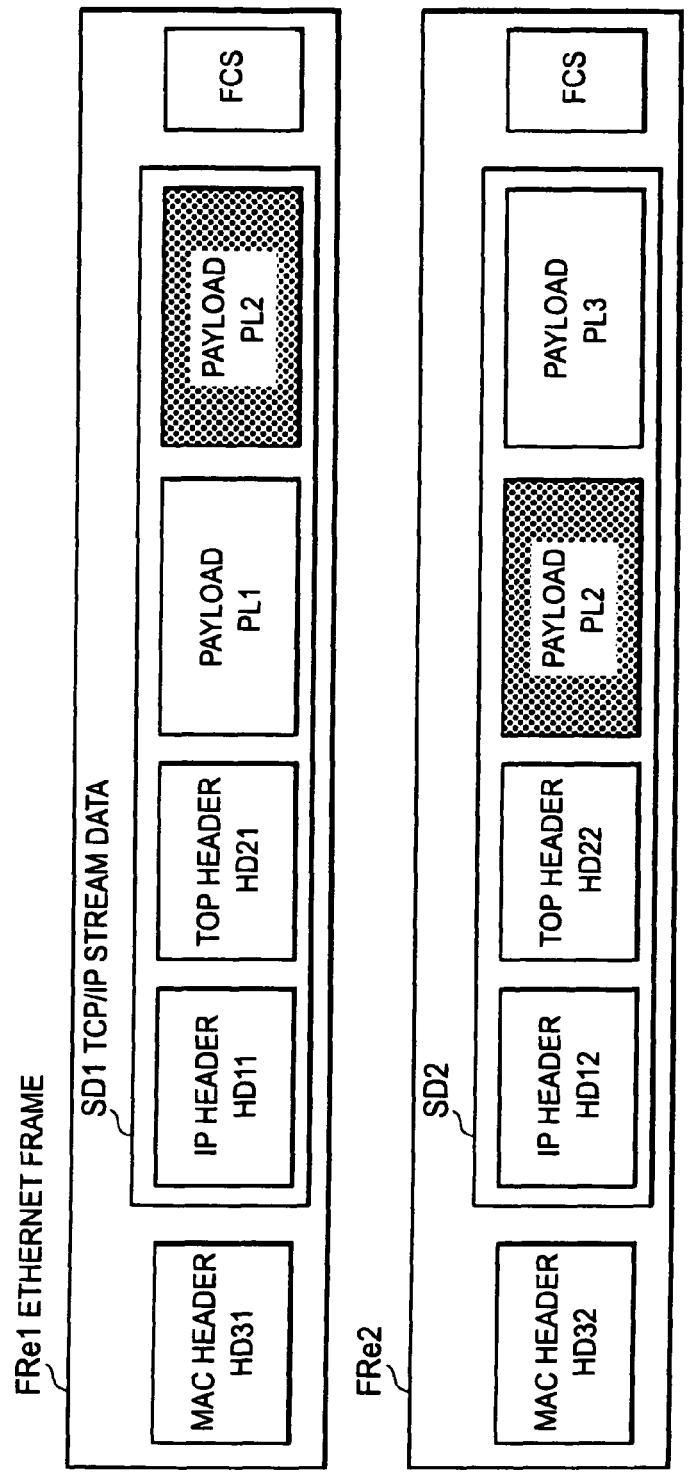
FIG. 6 is a diagram showing an example of a configuration of a frame sent within the communication apparatus according to embodiments 2 to 4 of the present invention.

The present embodiment describes a case where the communication apparatus 1 shown in FIG. 1 executes the checksum attachment processing to Ethernet frames FRe1 and FRe2 shown in FIG. 6. Here, as shown in FIG. 6, TCP/IP stream data SD1 in the frame FRe1 and TCP/IP stream data SD2 in the frame FRe2 have a common payload PL2. As a payload, the TCP/IP stream data SD1 and SD2 may include only the payload PL2 or may have more than two common payloads. Subsequent description is applied also to this case in the similar manner.

In the operation, first, the CPU 10 generates the Ethernet frames FRe1 and FRe2, and stores the Ethernet frames FRe1 and FRe2 in the main memory 20.

Figure 7:
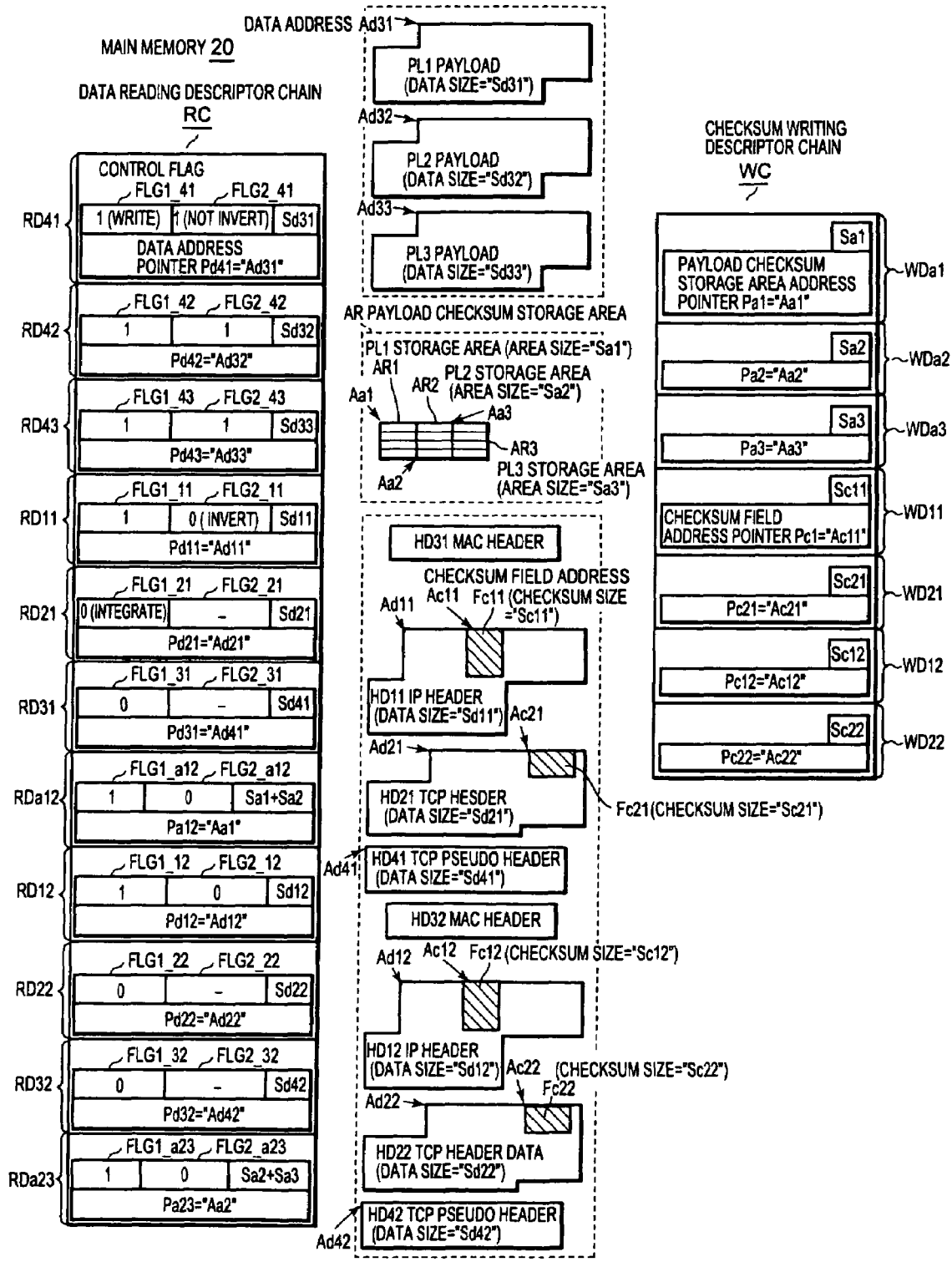
FIG. 7 is a diagram showing an example of a configuration of a descriptor chain used in the communication apparatus according to embodiment 2 of the present invention.

In the present embodiment, the CPU 10 forms an area AR for storing checksums for payloads PL1 to PL3 (hereinafter, referred to as a payload checksum storage area) in the main memory 20, as shown in FIG. 7. In this example, in the payload checksum storage area AR, an area AR1 for storing the checksum for the payload PL1 (hereinafter, referred to as a PL1 storage area), an area AR2 for storing the checksum for the payload PL2 (hereinafter, referred to as a PL2 storage area), and an area AR3 for storing the checksum of the payload PL3 (hereinafter, referred to as a PL3 storage area) are continuously provided. However, the areas AR1 to AR3 may not be continuously provided, and may be discontinuously provided as described later in embodiments 3 and 4.

Then, the CPU 10 stores a data reading descriptor chain RC in the main memory 20. The data reading descriptor chain RC consists of: reading descriptors RD41 to RD43 of the payloads PL1 to PL3; a reading descriptor RD11 of an IP header HD11; a reading descriptor RD21 of a TCP header HD21; a reading descriptor RD31 of a TCP pseudo header HD41; a descriptor RDa12 used for continuous reading from the PL1 storage area AR1 and the PL2 storage area AR2; a reading descriptor RD12 of an IP header HD12; a reading descriptor RD22 of a TCP header HD22; a reading descriptor RD32 of a TCP pseudo header HD42; and a descriptor RDa23 used for continuous reading from the PL2 storage area AR2 and the PL3 storage area AR3.

Here, in the reading descriptor RDa12, area size="Sa1+Sa2 (total size of the areas AR1 and AR2)" and payload checksum storage area address pointer Pa12="address Aa1" (start address of the area AR1) are set. In the reading descriptor RDa23, area size="Sa2+Sa3 (total size of the areas AR2 and AR3)" and payload checksum storage area address pointer Pa23="address Aa2 (start address of the area AR2)" are set. In subsequent description, the reading descriptor RDa12 and the RDa23 may be generically referred to as a reference numeral RDa.

Moreover, in addition to the control flag FLG1 described in the above-mentioned embodiment 1, the CPU 10 sets control flags FLG2_41 to FLG2_4, FLG2_11, FLG2_21, FLG2_31, FLG2_a12, FLG2_12, FLG2_22, FLG2_32, and FLG2_a23 (hereinafter, may be generically referred to as an FLG2) in the reading descriptors RD41 to RD43, RD11, RD21, RD31, RDa12, RD12, RD22, RD32, and RDa23, respectively. This control flag FLG2 is control information for instructing the checksum processor 30 whether to invert the checksum when writing the checksum for the data read with reference to the corresponding reading descriptor into the main memory 20.

Then, the CPU 10 stores a checksum writing descriptor chain WC in the main memory 20. The checksum writing descriptor chain WC consists of: a descriptor WDa1 used for writing into the PL1 storage area AR1; a descriptor WDa2 used for writing into the PL2 storage area AR2; a descriptor WDa3 used for writing into the PL3 storage area AR3; an IP checksum writing descriptor WD11 for the IP header HD11; a TCP checksum writing descriptor WD21 for the TCP header HD21, the TCP pseudo header HD41, and the payloads PL1 and PL2; an IP checksum writing descriptor WD12 for the IP header HD12; and a TCP checksum writing descriptor WD22 for the TCP header HD22, the TCP pseudo header HD42, and the payloads PL2 and PL3.

Here, in the writing descriptor WDa1, area size="Sa1 (size of the area AR1)" and payload checksum storage area address pointer Pa1="address Aa1" are set. In the writing descriptor WDa2, area size="Sa2 (size of the area AR2)" and payload checksum storage area address pointer Pa2="address Aa2" are set. In the writing descriptor WDa3, area size="Sa3 (size of the area AR3)" and payload checksum storage area address pointer Pa3="address Aa3 (start address of the area AR3)" are set.

Subsequently, the CPU 10 gives the checksum calculation start instruction INS1 to the checksum processor 30 similarly to the case of the above-mentioned embodiment 1.

When receiving the instruction INS1, first, the read DMA processor 32 in the checksum processor 30 reads the payload PL1 from the main memory 20, with reference to the reading descriptor RD41 in the data reading descriptor chain RC, and transfers the payload PL1 to the check sum calculator 33. Since "1 (not invert)" is set in the control flag FLG2_41 in the reading descriptor RD41 at this time, the read DMA processor 32 instructs the checksum calculator 33 to output the calculated checksum without inverting the calculated checksum.

The checksum calculator 33 calculates the checksum for the received payload PL1, and transfers the checksum to the write DMA processor 34 as it is.

In parallel with this, the read DMA processor 32 hands over the right of control to the write DMA processor 34, since the control flag FLG1_41="1 (write)" is held. The write DMA processor 34 writes the checksum for the payload PL1 into the PL1 storage area AR1, with reference to the writing descriptor WDa1 in the checksum writing descriptor chain WC. Subsequently, the write DMA processor 34 hands over the right of control to the read DMA processor 32.

In the similar manner, with reference to the reading descriptors RD42 and RD43 and the writing descriptors WDa2 and WDa3, the checksum processor 30 writes the checksum calculated for the payload PL2 into the PL2 storage area AR2 and the checksum calculated for the payload PL3 into the PL3 storage area AR3, as it is.

Thereby, the checksum for each payload is stored in the payload checksum storage area AR without being inverted. Here, the checksum for the payload is not inverted, in order to allow integration of the checksum for the payload with the checksum for the TCP header and the checksum for the TCP pseudo header without any conversion (in other words, in order to allow reuse of the checksum for each payload) when the checksum is read using the reading descriptor RDa.

Then, with reference to the reading descriptor RD11, the read DMA processor 32 reads the IP header HD11 from the main memory 20, and transfers the IP header HD11 to the checksum calculator 33. Since "0 (inversion)" is set in the control flag FLG2_11 in the reading descriptor RD11 at this time, the read DMA processor 32 instructs the checksum calculator 33 to invert and then output the calculated checksum.

The checksum calculator 33 calculates the IP checksum for the received IP header HD1, and transfers the inverted value of the IP checksum to the write DMA processor 34.

In parallel to this, the read DMA processor 32 hands over the right of control to the write DMA processor 34, since the control flag FLG1_11="1 (write)" is held. With reference to the writing descriptor WD11, the write DMA processor 34 writes the inverted value of the IP checksum for the IP header HD11 into the checksum field Fc11 in the IP header HD11 stored in the main memory 20. Subsequently, the write DMA processor 34 hands over the right of control to the read DMA processor 32.

Then, by sequentially referring to the reading descriptors RD21 and RD31, the read DMA processor 32 reads the TCP header HD21 and the TCP pseudo header HD41 from the main memory 20, and transfers the TCP header HD21 and the TCP pseudo header HD41 to the checksum calculator 33. Since "0 (integrate)" is set in both of the control flags FLG1_21 and FLG1_31 at this time, the read DMA processor 32 instructs the checksum calculator 33 to integrate the calculated checksum with a checksum for the next data without outputting the calculated checksum.

Accordingly, the checksum calculator 33 calculates checksums for the received TCP header HD21 and the received TCP pseudo header HD41, respectively, and subsequently, waits for the next data input from the read DMA processor 33.

Then, with reference to the reading descriptor RDa12, the read DMA processor 32 reads the checksums for the payloads PL1 and PL2 from the PL1 storage area AR1 and the PL2 storage area AR2 successively, and transfers the checksums to the checksum calculator 33. Since "0 (invert)" is set in the control flag FLG2_a12 in the reading descriptor RDa12 at this time, the read DMA processor 32 instructs the checksum calculator 33 to invert and then output the calculated checksum.

The checksum calculator 33 calculates the TCP checksum by integrating the checksums for the received payloads PL1 and PL2 with the checksums for the TCP header HD21 and the TCP pseudo header HD41, and transfers the inverted value of the TCP checksum to the write DMA processor 34.

In parallel with this, the read DMA processor 32 hands over the right of control to the write DMA processor 34, since the control flag FLG1_a12="1 (write)" is held. With reference to the writing descriptor WD21, the write DMA processor 34 writes the inverted value of the TCP checksum for the TCP header HD21, the TCP pseudo header HD41, and the payloads PL1 and PL2 into the checksum field Fc21 in the TCP header HD21 stored in the main memory 20.

Thereby, the checksum attachment processing on the Ethernet frame FRe1 shown in FIG. 6 is completed. The checksum processor 30 can also execute the checksum attachment processing in accordance with the UDP when the CPU 10 stores a UDP header, a UDP pseudo header, and reading descriptors for these in the main memory 20 instead of the TCP header HD21, the TCP pseudo header HD41, and the reading descriptors RD21 and RD31, and when "1 (not invert)" is set in the control flag FLG2_a12 in the reading descriptor RDa12.

Next, with reference to the reading descriptors RD12, RD22, RD32, and RDa23, and the writing descriptors WD12 and WD22, the checksum processor 30 executes the checksum attachment processing to the Ethernet frame FRe2, similarly to the above-mentioned case.

Subsequently, similarly to the case of the above-mentioned embodiment 1, the transmission DMA processor 421 in the transmission processor 42 reads the Ethernet frames FRe1 and FRe2 from the main memory 20, and sends the Ethernet frames FRe1 and FRe2 to the network.

Thus, the checksum for the payload common between the frames can be reused by setting the additional control flag FLG2 in the reading descriptor RD in the data reading descriptor chain RC (in other words, redundant calculation of the checksum for each frame can be eliminated). Accordingly, frame generation efficiency can be improved.

Embodiment 3

The present embodiment describes a case where the communication apparatus 1 shown in FIG. 1 executes the checksum attachment processing on the Ethernet frames FRe1 and FRe2 shown in FIG. 6, similarly to the case of the above-mentioned embodiment 2. However, unlike the case of the above-mentioned embodiment 2, the checksum processor 30 unconditionally inverts the checksum for the payload, the IP checksum, and the TCP checksum at the time of writing to the main memory 20, while re-inverting the inverted value of the checksum for the payload at the time of reading from the main memory 20.

Hereinafter, an example of the checksum attachment processing in the present embodiment will be described with reference to FIG. 8. Since the frame sending processing is the same as that of the above-mentioned embodiment 2, description thereof will be omitted.

Figure 8:
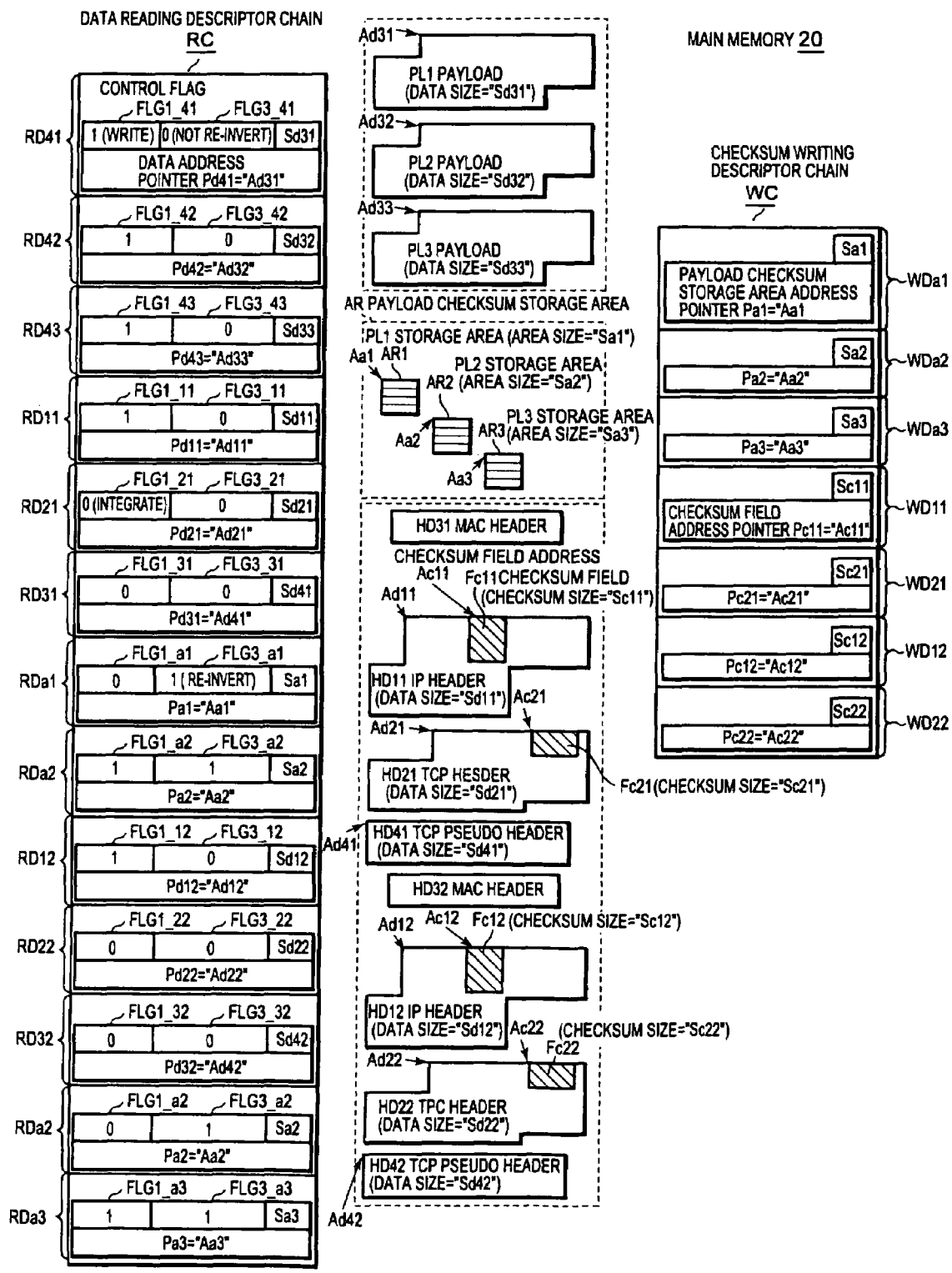
FIG. 8 is a diagram showing an example of a configuration of a descriptor chain used in the communication apparatus according to embodiment 3 of the present invention.

As shown in FIG. 8, first, the CPU 10 generates the Ethernet frames FRe1 and FRe2, and stores the Ethernet frames FRe1 and FRe2 in the main memory 20. Unlike the above-mentioned embodiment 2, in this example, the PL1 storage area AR1, the PL2 storage area AR2, and the PL3 storage area AR3 are discontinuously provided in the payload checksum storage area AR. These areas AR1 to AR3 may be continuously provided similarly to the case of the above-mentioned embodiment 2.

In this case, instead of the reading descriptors RDa12 and RDa23 shown in FIG. 7, the CPU 10 includes a descriptor RDa1 used for reading from the PL1 storage area AR1, a descriptor RDa2 used for reading from the PL2 storage area AR2, and a descriptor RDa3 used for reading from the PL3 storage area AR3 in the data reading descriptor chain RC.

Here, in the reading descriptor RDa1, area size="Sa1" and payload checksum storage area address pointer Pa1="address Aa1" are set. In the reading descriptor RDa2, area size="Sa2" and payload checksum storage area address pointer Pa2="address Aa2" are set. In the reading descriptor RDa3, area size="Sa3" and payload checksum storage area address pointer Pa3="address Aa3" are set.

Moreover, instead of the control flag FLG2 described in the above-mentioned embodiment 2, the CPU 10 respectively sets the control flags FLG3_41 to FLG3_43, FLG3_11, FLG3_21, FLG3_31, FLG3_a1, FLG3_a2, FLG3_12, FLG3_22, FLG3_32, FLG3_a2, and FLG3_a3 (hereinafter, may be generically referred to as a FLG3) in the reading descriptors RD41 to RD43, RD11, RD21, RD31, RDa1, RDa2, RD12, RD22, RD32, RDa2, and RDa3. This control flag FLG3 is control information for instructing the checksum processor 30 whether to re-invert the data when reading the data from the main memory 20, with reference to the corresponding reading descriptor.

Then, the CPU 10 stores the same checksum writing descriptor chain WC as that of FIG. 7 in the main memory 20, and also gives the checksum calculation start instruction INS1 to the checksum processor 30.

When receiving the instruction INS1, the read DMA processor 32 in the checksum processor 30 reads the payloads PL1 to PL3 from the main memory 20 by sequentially referring to the reading descriptors RD41 to RD43 in the data reading descriptor chain RC. Since "0 (non re-invert)" is commonly set in the control flags FLG3_41 to FLG3_43 in the reading descriptors RD41 to RD43 at this time, the read DMA processor 32 transfers the read payloads PL1 to PL3 to the checksum calculator 33 as it is. The checksum calculator 33 sequentially calculates the checksums for the payloads PL1 to PL3, and transfers an inverted value of each checksum to the write DMA processor 34.

By sequentially referring to the writing descriptors WDa1 to WDa3 in the checksum writing descriptor chain WC, the write DMA processor 34 writes the inverted value of the checksum for the payload PL1 into the PL1 storage area AR1, the inverted value of the checksum for the payload PL2 into the PL2 storage area AR2, and the inverted value of the checksum for the payload PL3 into the PL3 storage area AR3.

Then, the read DMA processor 32 reads the IP header HD11 from the main memory 20, with reference to the reading descriptor RD11. Since "0 (not re-invert)" is set in the control flag FLG3_11 in the reading descriptor RD11 at this time, the read DMA processor 32 transfers the read IP header HD11 to the checksum calculator 33 as it is. The checksum calculator 33 calculates the IP checksum for the received IP header HD11, and transfers the inverted value of the IP checksum to the write DMA processor 34. The write DMA processor 34 writes the inverted value of the IP checksum for the IP header HD11 into the checksum field Fc11 in the IP header HD11 stored in the main memory 20, with reference to the writing descriptor WD11.

Then, by sequentially referring to the reading descriptors RD21 and RD31, the read DMA processor 32 reads the TCP header HD21 and the TCP pseudo header HD41 from the main memory 20. Since "0 (not re-invert)" is set in both of the control flags FLG3_21 and FLG3_31 in the respective reading descriptors RD21 and RD31 at this time, the read DMA processor 32 transfers the read TCP header HD21 and TCP pseudo header HD41 to the checksum calculator 33 as it is. Since "0 (integrate)" is set in both of the control flags FLG1_21 and FLG1_31, the checksum calculator 33 calculates the checksum for the received TCP header HD21 and the checksum for TCP pseudo header HD41, respectively, and subsequently, waits for the next data input from the read DMA processor 32.

Then, the read DMA processor 32 reads the checksum for the payload PL1 from the PL1 storage area AR1, with reference to the reading descriptor RDa1. Since "1 (re-invert)" is set in the control flag FLG3_a1 in the reading descriptor RDa1 at this time, the read DMA processor 32 re-inverts the read inverted value of the checksum for the payload PL1, and transfers the re-inverted value to the checksum calculator 33. Since "0 (integrate)" is set in the control flag FLG1_a1, the checksum calculator 33 maintains the re-inverted checksum for the payload PL1, and waits for the next data input from the read DMA processor 32.

Then, the read DMA processor 32 reads the checksum for the payload PL2 from the PL2 storage area AR2, with reference to the reading descriptor RDa2. Since "1 (re-invert)" is set in the control flag FLG3_a2 in the reading descriptor RDa2 at this time, the read DMA processor 32 re-inverts the read inverted value of the checksum for the payload PL2, and transfers the re-inverted checksum to the checksum calculator 33. The checksum calculator 33 calculates the TCP checksum by integrating the re-inverted checksum for the payload PL2 with the maintained checksums for the TCP header HD21, the TCP pseudo header HD41, and the payload PL1, and transfers the inverted value of the TCP checksum to the write DMA processor 34.

Since the control flag FLG1_a2="1 (write)" is held, with reference to the writing descriptor WD21, the write DMA processor 34 writes the inverted value of the TCP checksum for the TCP header HD21, the TCP pseudo header HD41, and the payloads PL1 and PL2 into the checksum field Fc21 in the TCP header HD21 stored in the main memory 20.

Thereby, the checksum attachment processing on the Ethernet frame FRe1 shown in FIG. 6 is completed.

Next, with reference to the reading descriptors RD12, RD22, RD32, RDa2, and RDa3, and the writing descriptors WD12 and WD22, the checksum processor 30 executes the checksum attachment processing on the Ethernet frame FRe2 similarly to the above-mentioned method.

Thus, the use of the control flag FLG3 instead of the control flag FLG2 allows reuse of the checksum for the payload common between frames, thereby improving frame generation efficiency, similarly to the case of the above-mentioned embodiment 2.

Embodiment 4

The present embodiment describes a case where the communication apparatus 1 shown in FIG. 1 executes the checksum attachment processing on the Ethernet frames FRe1 and FRe2 shown in FIG. 6, similarly to the cases of the above-mentioned embodiments 2 and 3. The checksum processor 30 unconditionally inverts the checksum for the payload, the IP checksum, and the TCP checksum at the time of writing to the main memory 20, similarly to the case of the above-mentioned embodiment 3. However, unlike the above-mentioned embodiment 3, the checksum processor 30 requests the CPU 10 to re-invert the inverted value of the checksum for the payload written in the main memory 20.

Hereinafter, an example of the check attachment processing in the present embodiment will be described with reference to FIG. 9. Since the frame sending processing is the same as that of the above-mentioned embodiment 2, description thereof will be omitted.

Figure 9:
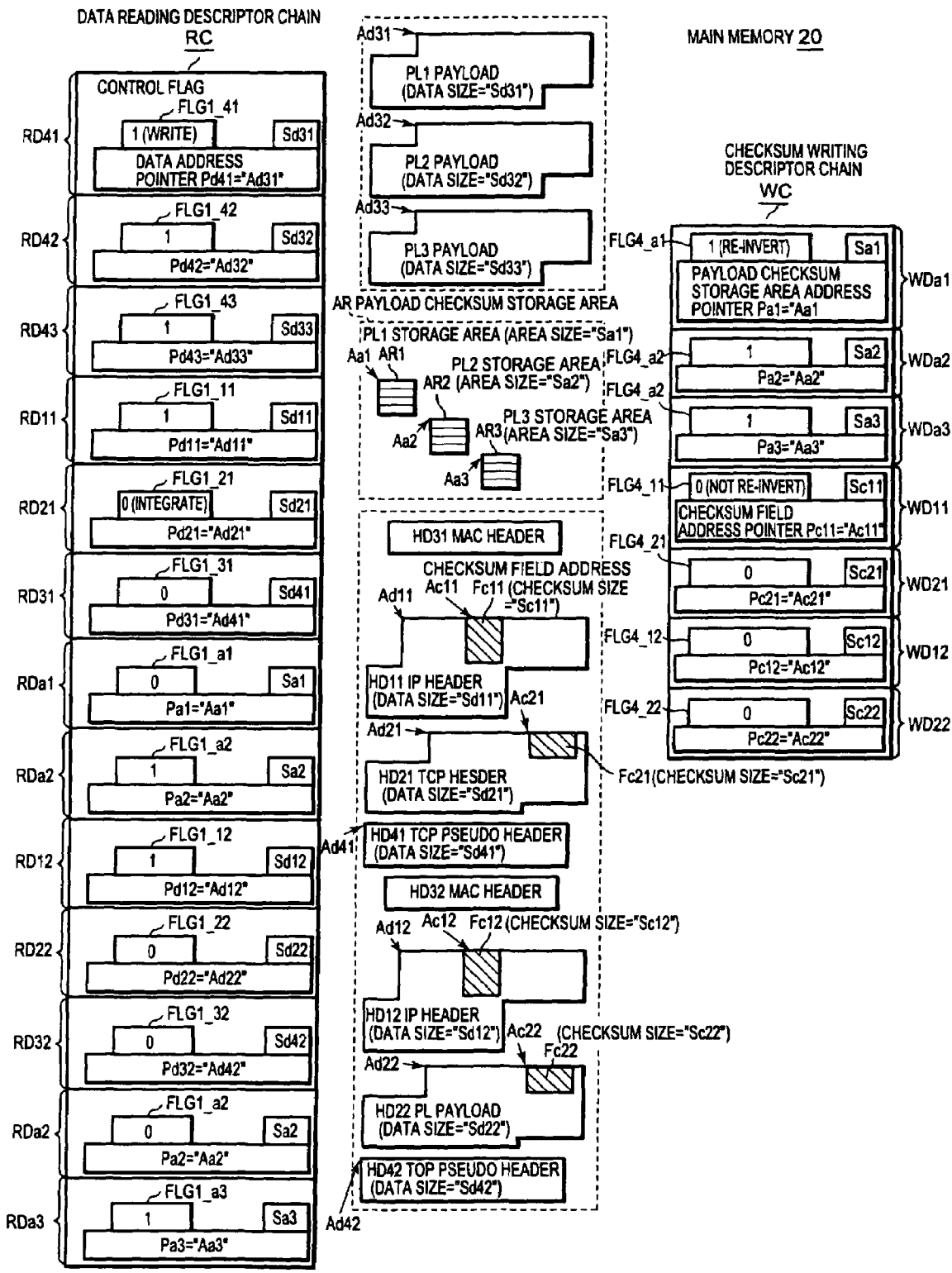
FIG. 9 is a diagram showing an example of a configuration of a descriptor chain used in the communication apparatus according to embodiment 4 of the present invention.

As shown in FIG. 9, first, the CPU 10 generates the Ethernet frames FRe1 and FRe2, and stores the Ethernet frames FRe1 and FRe2 in the main memory 20. In this example, the PL1 storage area AR1, the PL2 storage area AR2, and the PL3 storage area AR3 are discontinuously provided in the payload checksum storage area AR, similarly to the case of the above-mentioned embodiment 3. These areas AR1 to AR3 may be continuously provided, similarly to the case of the above-mentioned embodiment 2.

Unlike the above-mentioned embodiment 3, the CPU 10 does not set the control flag FLG3 shown in FIG. 8 in each reading descriptor in the data reading descriptor chain RC. Instead, the CPU 10 sets control flags FLG4_a1 to FLG4_a3, FLG4_11, FLG4_21, FLG4_12, and FLG4_22 (hereinafter, may be generically referred to as an FLG4) in the writing descriptors WDa1 to WDa3, WD11, WD21, WD12, and WD22 in the checksum writing descriptor chain WC, respectively. This control flag FLG4 is used by the checksum processor 30 to request the CPU 10 to perform re-inversion of an inverted value of data corresponding to the writing descriptor. The CPU 10 sets the control flag FLG4 to "0 (not re-invert)" when storing the checksum writing descriptor chain WC. The checksum processor 30 sets the control flag FLG4 to "1 (re-invert)" when requesting re-inversion.

Then, the CPU 10 gives the checksum calculation start instruction INS1 to the checksum processor 30.

When receiving the instruction INS1, the read DMA processor 32 in the checksum processor 30 reads the payloads PL1 to PL3 from the main memory 20 by sequentially referring to the reading descriptors RD41 to RD43 in the data reading descriptor chain RC, and transfers the payloads PL1 to PL3 to the checksum calculator 33. The checksum calculator 33 sequentially calculates the checksum for the payloads PL1 to PL3, and transfers an inverted value of each checksum to the write DMA processor 34.

By sequentially referring to the writing descriptors WDa1 to WDa3 in the checksum writing descriptor chain WC, the write DMA processor 34 writes the inverted value of the checksum for the payload PL1 into the PL1 storage area AR1, the inverted value of the checksum for the payload PL2 into the PL2 storage area AR2, and the inverted value of the checksum for the payload PL3 into the PL3 storage area AR3.

At this time, the write DMA processor 34 sets each of the control flags FLG4_a1 to FLG4_a3 to "1 (re-invert)." When detecting interruption by this setting of the control flags FLG4_a1 to FLG4_a3, the CPU 10 reads each of the inverted values of the checksums for the payloads PL1 to PL3 from the corresponding payload checksum storage area AR. The CPU 10 also re-inverts each read inverted value and rewrites the re-inverted value into the corresponding payload checksum storage area AR so that the checksum can be reused in the checksum processor 30.

Then, the read DMA processor 32 reads the IP header HD11 from the main memory 20 with reference to the reading descriptor RD11, and transfers the IP header HD11 to the checksum calculator 33. The checksum calculator 33 calculates the IP checksum for the received IP header HD11, and transfers the inverted value of the IP checksum to the write DMA processor 34. With reference to the writing descriptor WD11, the write DMA processor 34 writes the inverted value of the IP checksum for the IP header HD11 into the checksum field Fc11 in the IP header HD11 stored in the main memory 20.

Then, by sequentially referring to the reading descriptors RD21 and RD31, the read DMA processor 32 reads the TCP header HD21 and the TCP pseudo header HD41 from the main memory 20, and transfers the TCP header HD21 and the TCP pseudo header HD41 to the checksum calculator 33. Since "0 (integrate)" is set in both of the control flags FLG1_21 and FLG1_31 at this time, the checksum calculator 33 calculates the checksums for the received TCP header HD21 and TCP pseudo header HD41, respectively, and subsequently waits for the next data input from the read DMA processor 32.

Then, the read DMA processor 32 reads the re-inverted checksum for the payload PL1 from the PL1 storage area AR1 with reference to the reading descriptor RDa1, and transfers the re-inverted checksum to the checksum calculator 33. Since "0 (integrate)" is set in the control flag FLG1_a1 at this time, the checksum calculator 33 maintains the re-inverted checksum for the payload PL1, and waits for the next data input from the read DMA processor 32.

Then, the read DMA processor 32 reads the re-inverted checksum for the payload PL2 from the PL2 storage area AR2 with reference to the reading descriptor RDa2, and transfers the re-inverted checksum to the checksum calculator 33. The checksum calculator 33 calculates the TCP checksum by integrating the re-inverted checksum for the payload PL2 with the maintained checksums for the TCP header HD21, the TCP pseudo header HD41, and the payload PL1, and transfers the inverted value of the TCP checksum to the write DMA processor 34.

Since control flag FLG1_a2="1 (write)" is held at this time, with reference to the writing descriptor WD21, the write DMA processor 34 writes the inverted value of the TCP checksum for the TCP header HD21, the TCP pseudo header HD41, and the payloads PL1 and PL2 into the checksum field Fc21 in the TCP header HD21 stored in the main memory 20.

Thereby, the checksum attachment processing on the Ethernet frame FRe1 shown in FIG. 6 is completed.

Next, with reference to the reading descriptor RD12, RD22, RD32, RDa2, and RDa3, and the writing descriptors WD12 and WD22, the checksum processor 30 executes the checksum attachment processing on the Ethernet frame FRe2, similarly to the above-mentioned method.

Thus, even when the CPU 10 executes re-inversion of the inverted value of the checksum for the payload, use of the control flag FLG4 can suppress redundant generation of interruption for each frame. Accordingly, the processing load of the CPU 10 can be reduced.

The present invention will not be limited to the above-mentioned embodiments, and it is obvious that those skilled in the art can made various modifications based on the description of the scope of claims.

What is claimed is:

1. A communication apparatus, comprising:
   a bus that transfers data between components;
   a memory;
   a data generating unit that generates data and stores the data in the memory via the bus;
   a checksum processor that calculates a checksum for the data read from the memory via the bus, and writes the checksum into a predetermined position in the data stored in the memory via the bus; and
   a data sending unit that reads, from the memory via the bus, the data having the checksum written in the memory via the bus, and sends the data to a network,
   wherein,
   the data generating unit,
      generates as the data:
         a first data stream including a first IP header, a first TCP header and at least a first payload;
         a second data stream commonly including the first payload, and also including a second IP header and a second TCP header;
         a first TCP pseudo header used to calculate a checksum for the first TCP header and a checksum for the first payload; and
         a second TCP pseudo header used to calculate a checksum for the second TCP header and a checksum for the first payload,
      stores the first data stream, the second data stream, the first TCP pseudo header, and the second TCP pseudo header in the memory, and
      forms an area for storing the checksum for the first payload in the memory,
   the checksum processor,
      calculates a checksum for each of the first IP header, the first TCP header, the first TCP pseudo header, and the first payload, which are read from the memory,
      writes the checksum for the first payload into the area,
      inverts the checksum for the first IP header, and writes the inverted value of the checksum into a predetermined position in the first IP header stored in the memory,
      inverts an integrated value of the checksums for the first TCP header, the first TCP pseudo header, and the first payload, and writes the inverted value of the integrated value into a predetermined position in the first TCP header stored in the memory,
      calculates a checksum for each of the second IP header, the second TCP header, and the second TCP pseudo header, which are read from the memory,
      inverts the checksum for the second IP header, and writes the inverted value of the checksum into a predetermined position in the second IP header stored in the memory, and
      inverts an integrated value of the checksums for the second TCP header, the second TCP pseudo header, and the first payload read from the area, and writes the inverted integrated value of the integrated value into a predetermined position in the second TCP header stored in the memory; and
   the data sending unit reads, from the memory, the first stream data, in which the inverted values of the checksum for the first IP header and the integrated value of the checksums for the first TCP header, the first TCP pseudo header and the first payload are written, and the second stream data, in which the inverted values of the checksum for the second IP header and the integrated value of the checksums for the second TCP header, the second TCP pseudo header and the first payload are written, and then sends the first stream data and the second stream data to the network.

2. The communication apparatus according to claim 1, wherein
   the data generating unit stores a first descriptor chain and a second descriptor chain in the memory, the first descriptor chain including descriptors set to include pieces of storage information on the generated first IP header, second IP header, first TCP header, second TCP header, first TCP pseudo header, second TCP pseudo header, first payload, respectively, and including a descriptor set to include area information on the area, the second descriptor chain including descriptors set to include pieces of writing position information on the inverted value of the checksum for the first IP header, the inverted value of the checksum for the second IP header, the inverted value of the integrated value of the checksums for the first TCP header, the first TCP pseudo header, and the first payload, the inverted value of the integrated value of the checksums for the second TCP header, the second TCP pseudo header, and the first payload, respectively, and including a descriptor set to include the area information, and
   the checksum processor,
      reads the first and second IP headers, the first and second TCP headers, the first and second TCP pseudo headers, the first payload, and the checksum for the first payload from the memory, with reference to the first descriptor chain, and writes, into the memory, the inverted value of the checksum for the first IP header, the inverted value of the checksum for the second IP header, the inverted value of the integrated value of the checksums for the first TCP header, the first TCP pseudo header, and the first payload, and the inverted value of the integrated value of the checksums for the second TCP header, the second TCP pseudo header, and the first payload, with reference to the second descriptor chain.

3. The communication apparatus according to claim 2, wherein each piece of the storage information includes a size and a storage start address in the memory with respect to a corresponding one of the generated first and second IP headers, first and second TCP header, first and second TCP pseudo headers, and first payload;

the area information includes a size and an area start address in the memory with respect to the area; and each piece of the writing position information includes a size and a write start address in the memory with respect to a corresponding one of the inverted value of the checksum for the first IP header, the inverted value of the checksum for second IP header, the inverted value of the integrated value of the checksums for the first TCP header, the first TCP pseudo header, and the first payload, and the inverted value of the integrated value of the checksums for the second TCP header, the second TCP pseudo header, and the first payload.

4. The communication apparatus according to claim 2, wherein the data generating unit further sets first control information and second control information in each descriptor in the first descriptor chain, the first control information instructing the checksum processor whether to calculate the integrated value or to write the checksum, the second control information instructing the checksum processor whether or not to invert the checksum at a time of writing the checksum.

5. The communication apparatus according to claim 2, wherein the checksum processor inverts the checksum at a time of writing the checksum; and the data generating unit further sets first control information and second control information in each descriptor in the first descriptor chain, the first control information instructing the checksum processor whether to calculate the integrated value or to write the checksum, the second control information instructing the checksum processor whether or not to re-invert the inverted value at a time of reading data.

6. The communication apparatus according to claim 2, wherein the checksum processor inverts the checksum at a time of writing the checksum;

the data generating unit, comprises a re-inverting function to re-invert the inverted value;

sets control information in each descriptor in the first descriptor chain, the control information instructing the checksum processor whether to calculate the integrated value or to write the checksum; and provides a control information area in each descriptor in the second descriptor chain, the control information area used by the checksum processor to request re-inversion.

7. A communication method, comprising:

transferring data to components via a bus;

a data generating step of generating data and storing the data in a memory via the bus;

a checksum processing step of calculating a checksum for the data read from the memory via the bus, and writing the checksum into a predetermined position in the data stored in the memory via the bus; and a data sending step of reading, from the memory, the data having the checksum written in the memory via the bus, and sending the data to a network, wherein, the data generating step, generates as the data:

a first data stream including a first IP header, a first TCP header and at least a first payload;

a second data stream commonly including the common first payload, and also including a second IP header and a second TCP header;

a first TCP pseudo header used to calculate a checksum for the first TCP header and a checksum for the first payload; and a second TCP pseudo header used to calculate a checksum for the second TCP header and a checksum for the first payload;

stores the first data stream, the second data stream, the first TCP pseudo header, and the second TCP pseudo header in the memory, and forms an area for storing the checksum for the first payload in the memory;

the checksum processing step, calculates a checksum for each of the first IP header, the first TCP header, the first TCP pseudo header, and the first payload, which are read from the memory, writes the checksum for the first payload into the area, inverts the checksum for the first IP header, and writes the inverted value of the checksum into a predetermined position in the first IP header stored in the memory, inverts an integrated value of the checksums for the first TCP header, the first TCP pseudo header, and the first payload, and writes the inverted value of the integrated value into a predetermined position in the first TCP header stored in the memory, calculates a checksum for each of the second IP header, the second TCP header, and the second TCP pseudo header, which are read from the memory, inverts the checksum for the second IP header, and writes the inverted value of the checksum into a predetermined position in the second IP header stored in the memory, and inverts an integrated value of the checksums for the second TCP header, the second TCP pseudo header, and the first payload read from the area, and writes the inverted integrated value of the integrated value into a predetermined position in the second TCP header stored in the memory; and the data sending step reads, from the memory, the first stream data, in which the inverted values of the checksum for the first IP header and the integrated value of the checksums for the first TCP header, the first TCP pseudo header and the first payload are written, and the second stream data, in which the inverted values of the checksum for the second IP header and the integrated value of the checksums for the second TCP header, the second TCP pseudo header and the first payload are written, and then sends the first stream data and the second stream data to the network.

8. The communication method according to claim 7, wherein the data generating step stores a first descriptor chain and a second descriptor chain in the memory, the first descriptor chain including descriptors set to include pieces of storage information on the generated first IP header, second IP header, first TCP header, second TCP header, first TCP pseudo header, second TCP pseudo header, first payload, respectively, and including a descriptor set to include area information on the area, the second descriptor chain including descriptors set to include pieces of writing position information on the inverted value of the checksum for the first IP header, the inverted value of the checksum for the second IP header, the inverted value of the integrated value of the checksums for the first TCP header, the first TCP pseudo header, and the first payload, the inverted value of the integrated value of the checksums for the second TCP header, the second TCP pseudo header, and the first payload, respectively, and including a descriptor set to include the area information, and the checksum processing step, reads the first and second IP headers, the first and second TCP headers, the first and second TCP pseudo headers, the first payload, and the checksum for the first payload from the memory, with reference to the first descriptor chain, writes, into the memory, the inverted value of the checksum for the first IP header, the inverted value of the checksum for the second IP header, the inverted value of the integrated value of the checksums for the first TCP header, the first TCP pseudo header, and the first payload, and the inverted value of the integrated value of the checksums for the second TCP header, the second TCP pseudo header, and the first payload, with reference to the second descriptor chain.

9. The communication method according to claim 8, wherein each piece of the storage information includes a size and a storage start address in the memory with respect to a corresponding one of the generated first and second IP headers, first and second TCP header, first and second TCP pseudo headers, and first payload;

the area information includes a size and an area start address in the memory with respect to the area; and each piece of the writing position information includes a size and a write start address in the memory with respect to a corresponding one of the inverted value of the checksum for the first IP header, the inverted value of the checksum for second IP header, the inverted value of the integrated value of the checksums for the first TCP header, the first TCP pseudo header, and the first payload, and the inverted value of the integrated value of the checksums for the second TCP header, the second TCP pseudo header, and the first payload.

10. The communication method according to claim 7, wherein the data generating step further sets first control information and second control information in each descriptor in the first descriptor chain, the first control information instructing the checksum processing step whether to calculate the integrated value or to write the checksum, the second control information instructing the checksum processing step whether or not to invert the checksum at a time of writing the checksum.

11. The communication method according to claim 7, wherein the checksum processing step inverts the checksum at a time of writing the checksum; and the data generating step further sets first control information and second control information in each descriptor in the first descriptor chain, the first control information instructing the checksum processing step whether to calculate the integrated value or to write the checksum, the second control information instructing the checksum processing step whether or not to re-invert the inverted value at a time of reading data.

12. The communication method according to claim 7, wherein the checksum processing step inverts the checksum at a time of writing the checksum;

the data generating step has a re-inverting step for re-inverting the inverted value;

sets control information in each descriptor in the first descriptor chain, the control information instructing the checksum processing step whether to calculate the integrated value or to write the checksum; and provides a control information area in each descriptor in the second descriptor chain, the control information area used by the checksum processing step to request the re-inverting step.

* * * * *